(12) United States Patent
Thornton et al.

(10) Patent No.: US 9,537,313 B2
(45) Date of Patent: Jan. 3, 2017

(54) METHOD AND SYSTEM FOR USING DEMAND SIDE RESOURCES TO PROVIDE FREQUENCY REGULATION USING A DYNAMIC ALLOCATION OF ENERGY RESOURCES

(71) Applicant: Battelle Memorial Institute, Columbus, OH (US)

(72) Inventors: Douglas Thornton, Arlington, OH (US); Eric Rehberg, Westerville, OH (US); Lauren Adams, Hilliard, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 456 days.

(21) Appl. No.: 14/227,914

(22) Filed: Mar. 27, 2014

(65) Prior Publication Data

US 2014/0214227 A1 Jul. 31, 2014

Related U.S. Application Data

(63) Continuation-in-part of application No. PCT/US2013/073632, filed on Dec. 6, 2013.
(Continued)

(51) Int. Cl.
*G05D 3/12* (2006.01)
*H02J 3/00* (2006.01)
(Continued)

(52) U.S. Cl.
CPC ............... *H02J 3/00* (2013.01); *G05B 15/02* (2013.01); *H02J 3/14* (2013.01); *H02J 4/00* (2013.01);
(Continued)

(58) Field of Classification Search
None
See application file for complete search history.

(56) References Cited

U.S. PATENT DOCUMENTS

| | | | | |
|---|---|---|---|---|
| 5,576,700 A | * | 11/1996 | Davis | H02J 13/0086 340/3.31 |
| 5,675,503 A | * | 10/1997 | Moe | H02J 3/14 307/32 |

(Continued)

OTHER PUBLICATIONS

International Search Report for PCT/US2014/032049 dated Nov. 7, 2014.

(Continued)

*Primary Examiner* — Isaac T Tecklu
(74) *Attorney, Agent, or Firm* — Richard M. Klein; Fay Sharpe LLP

(57) ABSTRACT

Dispatch engines service endpoints by transmitting dispatch signals to the serviced endpoints that cause the endpoints to adjust their electric power consumption from the electric power grid in accord with a control signal received by the dispatch engine. A market interface dispatch engine receives its control signal from an electric power grid managing entity, and downstream dispatch engines form a hierarchy cascading downstream from the market interface dispatch engine with each downstream dispatch engine being an endpoint serviced by a dispatch engine located upstream in the hierarchy. The control signal received by each downstream dispatch engine comprises dispatch signals transmitted by the upstream dispatch engine. The endpoints further include electric power-consuming loads. A suitable load controller comprises separate power interface and logic elements operatively connected to define the load controller, with the logic element powered by low voltage DC power received from the power interface element.

27 Claims, 14 Drawing Sheets

Related U.S. Application Data

(60) Provisional application No. 61/734,537, filed on Dec. 7, 2012, provisional application No. 61/789,169, filed on Mar. 15, 2013.

(51) Int. Cl.
*H02J 4/00* (2006.01)
*H02J 3/14* (2006.01)
*H02J 13/00* (2006.01)
*G05B 15/02* (2006.01)

(52) U.S. Cl.
CPC .......... *H02J 13/0006* (2013.01); *H02J 13/002* (2013.01); *H02J 13/0062* (2013.01); *H02J 13/0075* (2013.01); *Y02B 70/3225* (2013.01); *Y02B 90/2615* (2013.01); *Y02B 90/2638* (2013.01); *Y02B 90/2653* (2013.01); *Y04S 20/222* (2013.01); *Y04S 40/121* (2013.01); *Y04S 40/124* (2013.01); *Y04S 40/126* (2013.01)

(56) References Cited

U.S. PATENT DOCUMENTS

| | | | |
|---|---|---|---|
| 6,624,532 B1 | 9/2003 | Davidow et al. | |
| 6,745,109 B2* | 6/2004 | Kojima | G06Q 50/06 700/28 |
| 7,580,775 B2 | 8/2009 | Kulyk et al. | |
| 7,653,443 B2 | 1/2010 | Flohr | |
| 7,715,951 B2 | 5/2010 | Forbes, Jr. et al. | |
| 7,839,027 B2 | 11/2010 | Shelton et al. | |
| 7,894,946 B2 | 2/2011 | Kulyk et al. | |
| 7,962,248 B2 | 6/2011 | Flohr | |
| 8,010,812 B2 | 8/2011 | Forbes, Jr. et al. | |
| 8,032,233 B2 | 10/2011 | Forbes, Jr. et al. | |
| 8,121,742 B2 | 2/2012 | Flohr et al. | |
| 8,131,403 B2 | 3/2012 | Forbes, Jr. et al. | |
| 8,178,997 B2 | 5/2012 | Talkin et al. | |
| 8,204,633 B2 | 6/2012 | Harbin, III et al. | |
| 8,220,721 B2 | 7/2012 | Flohr | |
| 8,234,876 B2 | 8/2012 | Parsonnet et al. | |
| 8,249,756 B2 | 8/2012 | Boss et al. | |
| 8,271,143 B2 | 9/2012 | Deivasigamani et al. | |
| 8,306,671 B1 | 11/2012 | Marcus | |
| 8,307,225 B2 | 11/2012 | Forbes, Jr. et al. | |
| 8,311,681 B1 | 11/2012 | Marcus | |
| 8,359,125 B2 | 1/2013 | Park | |
| 8,396,606 B2 | 3/2013 | Forbes, Jr. et al. | |
| 8,401,709 B2 | 3/2013 | Cherian et al. | |
| 8,457,800 B2 | 6/2013 | Marcus | |
| 8,527,108 B2 | 9/2013 | Kulyk et al. | |
| 8,527,109 B2 | 9/2013 | Kulyk et al. | |
| 8,571,692 B2 | 10/2013 | Flohr et al. | |
| 8,671,167 B2 | 3/2014 | Koch | |
| 8,700,187 B2 | 4/2014 | Forbes, Jr. | |
| 8,704,678 B2 | 4/2014 | Wang et al. | |
| 2003/0015873 A1* | 1/2003 | Khalizadeh | H02P 9/04 290/7 |
| 2003/0236593 A1* | 12/2003 | Schumacher | H02J 3/14 700/291 |
| 2004/0137314 A1* | 7/2004 | Fukui | H01M 2/348 429/62 |
| 2005/0020232 A1* | 1/2005 | Bonicatto | H04B 3/54 455/402 |
| 2005/0116836 A1* | 6/2005 | Perry | H04Q 9/00 340/870.02 |
| 2007/0097716 A1* | 5/2007 | Clark | H05B 41/40 363/39 |
| 2008/0167756 A1 | 7/2008 | Golden et al. | |
| 2009/0240381 A1* | 9/2009 | Lane | H02J 3/14 700/296 |
| 2009/0326726 A1* | 12/2009 | Ippolito | H02J 3/14 700/291 |
| 2010/0179705 A1 | 7/2010 | Flohr | |
| 2010/0179862 A1* | 7/2010 | Chassin | G06Q 10/06 705/412 |
| 2010/0198713 A1* | 8/2010 | Forbes, Jr. | G06Q 10/00 705/34 |
| 2010/0217550 A1* | 8/2010 | Crabtree | H02J 3/005 702/62 |
| 2011/0071690 A1* | 3/2011 | Sun | G06Q 10/06 700/286 |
| 2011/0118862 A1* | 5/2011 | Boss | H02J 3/14 700/100 |
| 2011/0202467 A1* | 8/2011 | Hilber | G06Q 50/188 705/80 |
| 2011/0213508 A1* | 9/2011 | Mandagere | G06F 1/3203 700/291 |
| 2012/0150359 A1 | 6/2012 | Westergaard | |
| 2012/0152514 A1* | 6/2012 | Takasaki | F24D 19/1039 165/241 |
| 2012/0191262 A1 | 7/2012 | Marcus | |
| 2012/0217803 A1 | 8/2012 | Talkin et al. | |
| 2012/0221163 A1* | 8/2012 | Forbes, Jr. | G06Q 10/00 700/295 |
| 2012/0239218 A1* | 9/2012 | Forbes, Jr. | G01D 4/004 700/295 |
| 2012/0245753 A1 | 9/2012 | Forbes, Jr. | |
| 2012/0316695 A1* | 12/2012 | Chen | H02J 3/008 700/296 |
| 2013/0033234 A1* | 2/2013 | Koritarov | H02J 7/04 320/137 |
| 2013/0060397 A1* | 3/2013 | Hawkins | G06Q 10/0631 700/296 |
| 2013/0123999 A1* | 5/2013 | Pereira | G05D 23/1924 700/295 |
| 2013/0178991 A1 | 7/2013 | Gheerardyn et al. | |
| 2013/0245853 A1 | 9/2013 | Kulyk et al. | |
| 2013/0268137 A1 | 10/2013 | Kulyk et al. | |
| 2013/0320762 A1 | 12/2013 | Trudel et al. | |
| 2013/0321040 A1 | 12/2013 | Johal et al. | |
| 2013/0325691 A1* | 12/2013 | Chassin | G06Q 20/102 705/37 |
| 2014/0018969 A1* | 1/2014 | Forbes, Jr. | H02J 3/32 700/295 |
| 2014/0037275 A1 | 2/2014 | Flohr | |
| 2014/0052307 A1 | 2/2014 | Flohr et al. | |
| 2014/0052308 A1 | 2/2014 | Hanafusa | |
| 2014/0094979 A1* | 4/2014 | Mansfield | H02J 3/383 700/291 |
| 2014/0105584 A1 | 4/2014 | Flohr | |

OTHER PUBLICATIONS

Heffner, "Innovative Approaches to Verifying Demand Response of Water Heater Load Control," IEEE Tran. On Power Delivery, pp. 1-11 (2005).

Alvarez, et al., "Assessment and simulation of the responsive demand potential in end-user facilities: application to a university customer," IEEE Trans. On Power Systems, vol. 19, pp. 1223-1231 (2004).

Cirio, et al., "Load as Potential Contributor to Security Control and Economy Management in Liberalized Power Systems," Bulk Power System Dynamics and Control —VI, pp. 22-27 (2004).

Hirst & Kirby, "Water Heaters to the Rescue," Public Utilities Forthnightly, pp. 1-7 (Sep. 2003).

Kirby & Staunton, "Technical Potential for Peak Load Management Programs in New Jersey," Oak Ridge National Laboratory ORNL/TM-2002/271, pp. 1-45 (Oct. 2002).

Kirby, "Spinning Reserve From Responsive Loads," Oak Ridge National Laboratory ORNL/TM-2003/19, pp. 1-42 (Mar. 2003).

Lockheed Martin Aspen, et al. "Demand Response Enabling Technologies for Small-Medium Businesses", submitted to Mark S. Martinez, Southern California Edison Company, pp. 1-84(Apr. 12, 2006).

Molina et al., "Approach to Multivariate Predictive Control Applications in Residential HVAC Direct Load Control", IEEE, pp. 1811-1816 (2000).

(56) References Cited

OTHER PUBLICATIONS

Brooks & Thesen, PG & E and Tesla Motors: Vehicle to Grid Demonstration and Evaluation Program, EVS23 pp. 1-10 (2007).
Kempton, et al., "A Test of Vehicle-to-Grid (V2G) for Energy Storage and Frequency Regulation in the PJM System", pp. 1-32 (Nov. 2008).
Brooks, "Vehicle-to-Grid Demonstration Project: Grid Regulation Ancillary Service with a Battery Electric Vehicle", Contract No. 01-313, prepared for the California Air Resources Board and the California Environmental Protection Agency, pp. 1-55 (Dec. 10, 2002).
Brooks & Gage, "Integration of Electric Drive Vehicles with the Electric Power Grid—a New Value Stream", EVS 18, pp. 1-16 Berlin (2001).

\* cited by examiner

METHOD AND SYSTEM FOR USING DEMAND SIDE RESOURCES TO PROVIDE FREQUENCY REGULATION USING A DYNAMIC ALLOCATION OF ENERGY RESOURCES

This application is a continuation-in-part of International Application No. PCT/US2013/073632 filed Dec. 6, 2013 which claims the benefit of U.S. Provisional Application No. 61/789,169 filed Mar. 15, 2013 and U.S. Provisional Application No. 61/734,537 filed Dec. 7, 2012, all of which are incorporated herein by reference in their entireties.

BACKGROUND

The following relates to systems and methods for providing services to an electric power grid. For example, an ancillary system may provide a load whose electric power draw can be adjusted in order to provide capacity for use in frequency regulation of the electric power grid. The ancillary system may additionally or alternatively provide source capacity whose electrical power supplied to the electric grid can be adjusted in order to provide capacity for use in frequency regulation of the electric power grid. By way of illustrative example, it is known to provide ancillary power generators to provide excess source capacity, and/or flywheels or the like to provide excess load.

BRIEF SUMMARY

In some illustrative embodiments disclosed as illustrative examples herein, a system operative in conjunction with an electric power grid managed by an electric power grid managing entity comprises a plurality of dispatch engines comprising electronic data processing devices. Each dispatch engine is configured to service endpoints operatively connected with the dispatch engine by transmitting dispatch signals to the serviced endpoints that cause the serviced endpoints to adjust electric power consumed by the endpoints from the electric power grid in accord with a control signal received by the dispatch engine. The plurality of dispatch engines includes a market interface dispatch engine operatively connected to receive its control signal from the electric power grid managing entity, and second level dispatch engines operatively connected to receive their control signals from the market interface dispatch engine wherein their control signals comprise dispatch signals transmitted from the market interface dispatch engine to the second level dispatch engines. The second level dispatch engines are configured to service endpoints comprising electric power-consuming loads that consume electric power from the electric power grid. The plurality of dispatch engines may further include at least one further downstream dispatch engine operatively connected to receive its control signal from one of the second level dispatch engines comprising a dispatch signal transmitted from the second level dispatch engine to the further downstream dispatch engine, with the at least one further downstream dispatch engine configured to service endpoints comprising electric power-consuming loads that consume electric power from the electric power grid. The endpoints may further comprise sources that supply electric power to the electric power grid wherein the sources consume negative electric power from the electric grid corresponding to supplying electric power to the electric grid. In some embodiments the second level dispatch engines are distributed geographically over a plurality of geographical locations.

In some illustrative embodiments disclosed as illustrative examples herein, a system operative in conjunction with an electric power grid managed by an electric power grid managing entity comprises a plurality of dispatch engines comprising electronic data processing devices. Each dispatch engine is configured to service endpoints operatively connected with the dispatch engine by transmitting dispatch signals to the serviced endpoints that cause the serviced endpoints to adjust electric power consumed by the endpoints from the electric power grid in accord with a control signal received by the dispatch engine. The plurality of dispatch engines includes a market interface dispatch engine operatively connected to receive its control signal from the electric power grid managing entity, and downstream dispatch engines forming a hierarchy cascading downstream from the market interface dispatch engine with each downstream dispatch engine being an endpoint serviced by a dispatch engine located upstream in the hierarchy. The control signal received by each downstream dispatch engine comprises dispatch signals transmitted by the dispatch engine located upstream in the hierarchy. The endpoints serviced by the plurality of dispatch engines further include electric power-consuming loads that consume electric power from the electric power grid. In some embodiments, the hierarchy has a cascade depth D which is the longest path of cascaded dispatch engines, including the market interface dispatch engine, in the hierarchy, dispatch signals to the electric power-consuming loads are updated at an advising rate, and dispatch signals to downstream dispatch engines are updated at a rate that is at least D times the advising rate at which the dispatch signals to the electric power-consuming loads are updated. In some embodiments the downstream dispatch engines are distributed over a plurality of geographical locations.

In some illustrative embodiments disclosed as illustrative examples herein, a load controller is configured to control electric power consumption by an electric power-consuming load in accord with a dispatch signal received by the load controller. In some such embodiments the load controller comprises a power interface element and a logic element. The power interface element comprises electric power circuitry configured to conduct AC electric power capable of powering the electric power-consuming load. The logic element comprises an electronic data processing device configured to receive a dispatch signal and to control power delivered to the electric power-consuming load by the power interface element based on the received dispatch signal. The logic element does not contain electric power circuitry configured to conduct AC electric power capable of powering the electric power-consuming load. The logic element and the power interface element are separate units that are operatively connected to define the load controller, with the logic element powered by low voltage DC power received from the power interface element. The logic element may be further configured to generate a value for a state parameter that is indicative of energy stored at the electric power-consuming load. In some embodiments the power-consuming load includes a hot water tank and a water heater configured to heat water in the hot water tank, wherein the load controller is operatively connected with the water heater to control power delivered to the water heater based on the received dispatch signal. In such embodiments the logic element may be further configured to generate a value for a state parameter that is indicative of thermal energy stored in the hot water tank based on one or more measurements of water temperature.

DETAILED DESCRIPTION

Disclosed herein are embodiments of a system of electricity consuming devices with communications capability, along with one or more aggregation points which are limited (at least some of the time) in their capacity to deliver power to the electricity consuming devices. Further disclosed herein are embodiments of a method for prioritizing the consumption of electricity amongst the devices and utilizing non-price rationing to allocate the scarce energy resources. Further disclosed herein are embodiments in which the measurement and verification of demand responsive loads are confirmed by n-interval scheduling and measuring the compliance to a control signal against variations in the schedule.

Figure 1:
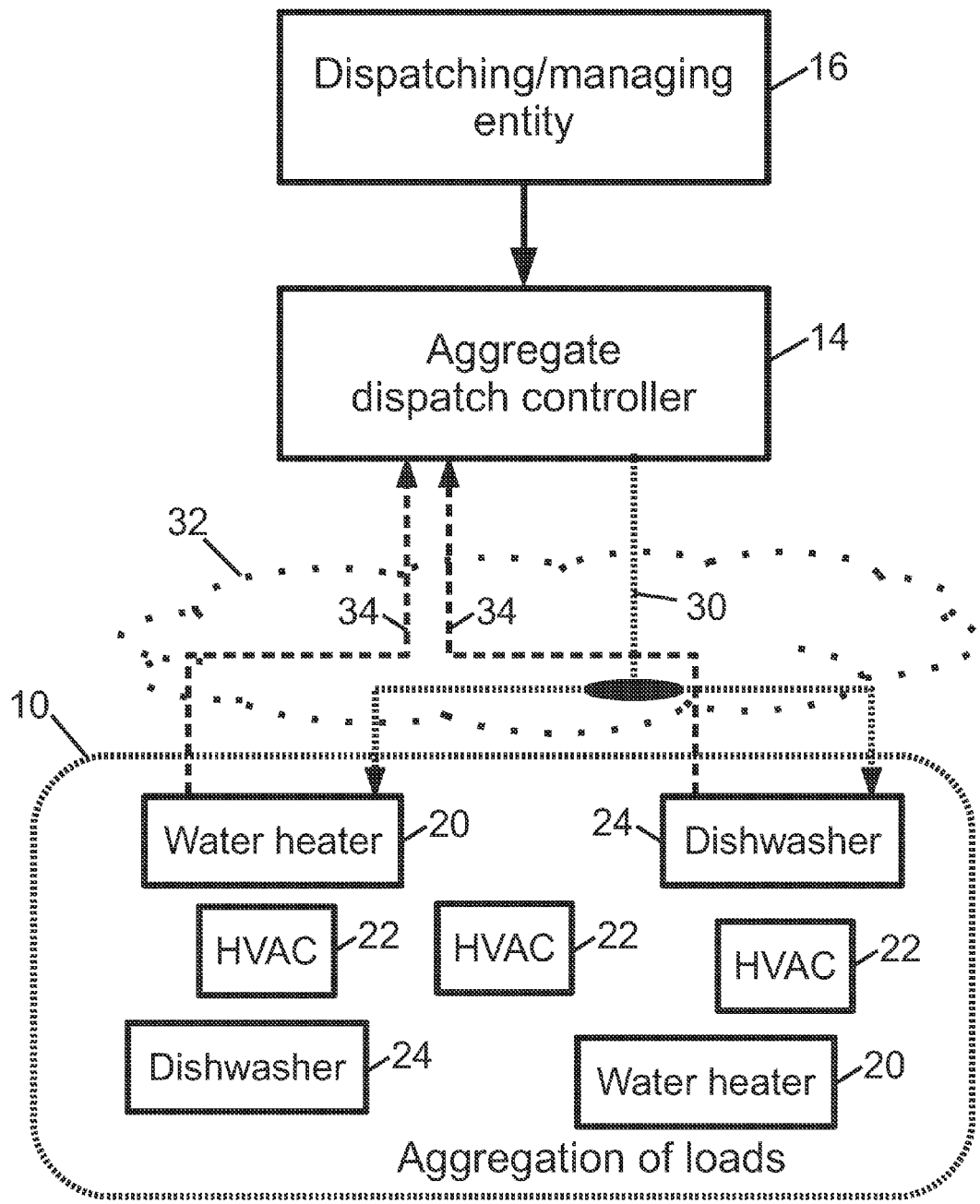
FIG. 1 diagrammatically shows an illustrative system using demand-side resources to provide power management.

With reference to FIG. 1, an illustrative system includes the following components: a collection (i.e. aggregation 10) of energy (i.e. power) consuming devices; an aggregate dispatch controller 14; and a dispatching/managing entity 16.

The energy (i.e. power) consuming devices (or loads) have consumption flexibility. For example, the energy consuming devices may be thermal loads such as a hot water heater 20 or heating, ventilation, and air conditioning (HVAC) 22, or time base loads such as a dishwasher 24. Each energy consuming device includes state monitoring and reporting/bidding functionality, for example a microprocessor or microcontroller with firmware stored on a memory chip (optionally updateable). The collection of devices 20, 22, 24 under control of a single dispatch control signal 30 is referred to herein as an aggregation 10.

The system further includes the aggregate dispatch controller 14 that operates as a device state aggregator receiving constraint inputs from the dispatching/managing entity. The aggregate dispatch controller 14 outputs a base dispatch control point (e.g. 50% on non-event periods) and event settings and adjustments. The aggregate dispatch controller also monitors events and outputs dispatch adjustments, monitors and estimates (e.g. forecasts) capacity. The aggregate dispatch controller 14 is suitably embodied as a computer or other electronic data processing device programmed to perform the energy consumption forecasting, management, and dispatch control operations as disclosed herein. To perform these functions, the aggregate dispatch controller 14 is in electronic communication with the energy consuming devices 20, 22, 24 of the aggregation 10 by a suitable communication link 32 such as the Internet, a wired and/or wireless local area network, broadband power line (BPL) link, various combinations thereof, or so forth.

The dispatching/managing entity 16 informs the aggregate dispatch controller 14 of the energy requirements or constraints that the aggregation 10 of energy consuming devices 20, 22, 24 is to fulfill. The dispatching/managing entity 16 can be various entities, such as a building manager (if the devices of the aggregation are all in a single high-rise building, for example), a city power manager (if the devices of the aggregation are all within city boundaries, for example), a facility manager (if the devices of the aggregation are all in a single corporate facility, possibly a multi-building campus, for example), or so forth. The dispatching/managing entity 16 determines the energy consumption requirements for the aggregation 10 to fulfill the goal of the dispatching/managing entity, and this goal may be varied (e.g. frequency regulation, or price optimization, or load management, et cetera).

The aggregate dispatch controller 14 is a centralized control system that communicates with all energy consuming devices 20, 22, 24 participating in the system (i.e., in the aggregation 10 of devices). It sets a Transaction Interval (usually on the order of 5 minutes) in order to manage power consumption for an interval of time. During each Transaction Interval, the Aggregate Dispatch Controller 14 communicates with each energy consuming device 20, 22, 24 in the system (i.e. aggregation 10) and manages energy consumption across those devices according to system conditions, device prioritization, and system forecasts.

Each participating device 20, 22, 24 within an aggregation calculates its own Priority Vector (PV). The Priority Vector is a dimensionless value that represents the device's projected "need" for energy over the following Transaction Interval and possibly over subsequent Transaction Intervals.

Figure 2:
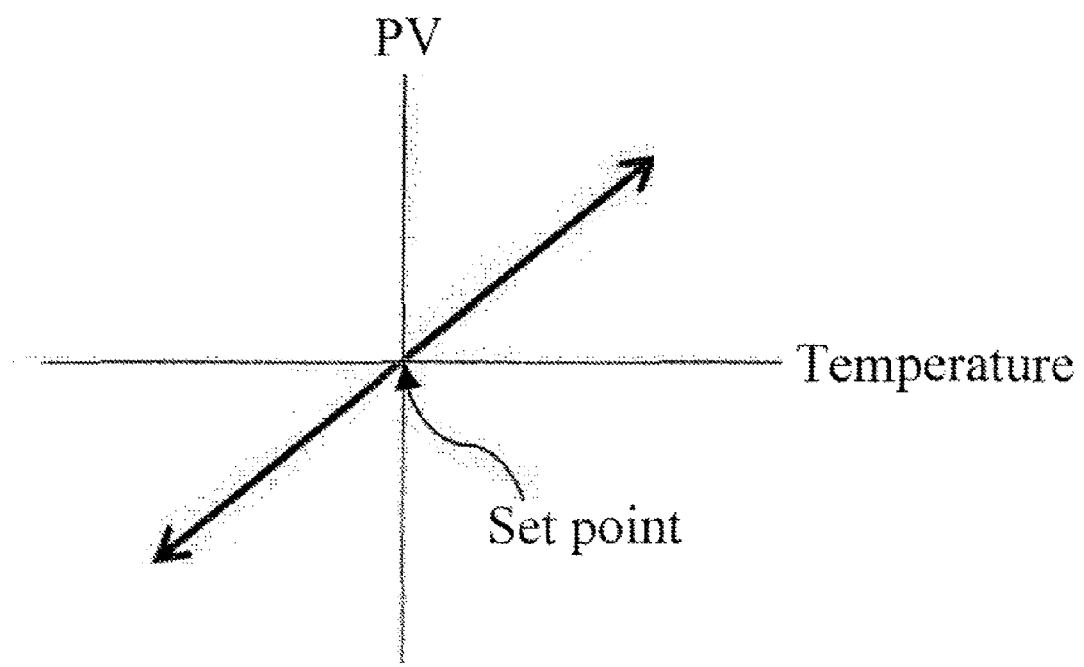
FIG. 2 diagrammatically shows a sample curve showing a temperature versus priority vector relationship.

With reference to FIG. 2, as an example, a thermostat programmed to maintain a cooling temperature of 72° F. (by way of illustrative example; more generally, an arbitrary setpoint could be programmed) will increase its Priority Vector as the temperature increases above the cooling set point. Each device also provides its estimated amount of energy to be used in the next Transaction Interval in addition to its Priority Vector. The use of a Priority Vector enables the device to inform the aggregate dispatch controller of its projected energy "need" over two or more successive Time Intervals. To this end, in some embodiments each Priority Vector includes multi-time period aspects. For instance if a process such as a dishwasher 24 needs to run in the next 3 hours, it could have a low priority in the first hour (first element of the PV if the time interval is one hour), a medium priority in the second hour (second element of the PV), and then a 100% priority in the third hour. The 100% indicates it must run in the third hour if it did not run in the first two hours. The aggregate dispatch controller 14 then schedules the dishwasher 24 to run accordingly in whichever hour is most beneficial, while obeying the constraint that the dishwasher must run at some point in the next three time intervals (hours)—this allows for multi-hour scheduling. Such multi-time period PV can be applied to other types of devices, such as thermal loads, as long as their time constants are longer than the bid periods. For example, consider an air conditioner which is n degrees below its maximum allowable room temperature, which translates (in this illustrative example) into 3 time intervals until the room reaches that maximum allowable temperature if the air conditioner does not run. This air conditioner would bid similarly to the dishwasher above so that it will be guaranteed to run before the room reaches the maximum allowable temperature, but only will run in period 1 or 2 if there is available capacity and other loads do not have higher priorities.

Note that while illustrative FIG. 2 shows a linear PV versus temperature characteristic, more generally the characteristic may be nonlinear, and furthermore the abscissa may be different, e.g. the PV of a dishwasher may be based on a given time interval (e.g. overnight) during which the dishwasher is scheduled to run.

The aggregate dispatch controller 14 performs supply and demand matching. The aggregate dispatch controller 14 receives all Priority Vectors and energy consumption predictions from each energy consuming device 20, 22, 24 in the system (i.e. receives a bid 34 from each energy consuming device 20, 22, 24 in the aggregation 10), and assembles them in order of ascending Priority Vector. The aggregate dispatch controller 14 also monitors system conditions for factors such as wholesale price, capacity limits, congestion, or other supply limiting factors and creates a supply profile for varying levels of demand.

To facilitate multi-time period forecasting/scheduling, the supply side (i.e. dispatching/managing entity 16) can also provide information on its requirements over several time intervals, using a format similar to the Priority Vectors described for the bids 34 provided by the energy consuming devices 20, 22, 24. The Supply-Side Vector can include attributes such as production capability and distribution constraints that may change dynamically (e.g. higher temperatures reduce transfer capacity).

In addition to system level supply constraints, an operator of the aggregate dispatch controller 14 can introduce directed control levels to manage total load to a given constraint.

The aggregate controller 14 employs schedule-based commitment intervals. A resource (e.g. device 20, 22, 24) is scheduled to participate in N numbered Transaction Intervals. Control signals from a dispatcher, markets, or system factors are interpreted into variations on supply constraints. The dispatching entity 16 determines the level of load reduction/increase desired based on its objectives, which include be operational efficiency, scarcity, or economics. Measurement of demand responsiveness is compared against the committed schedule for N Transaction Intervals.

Figure 3:
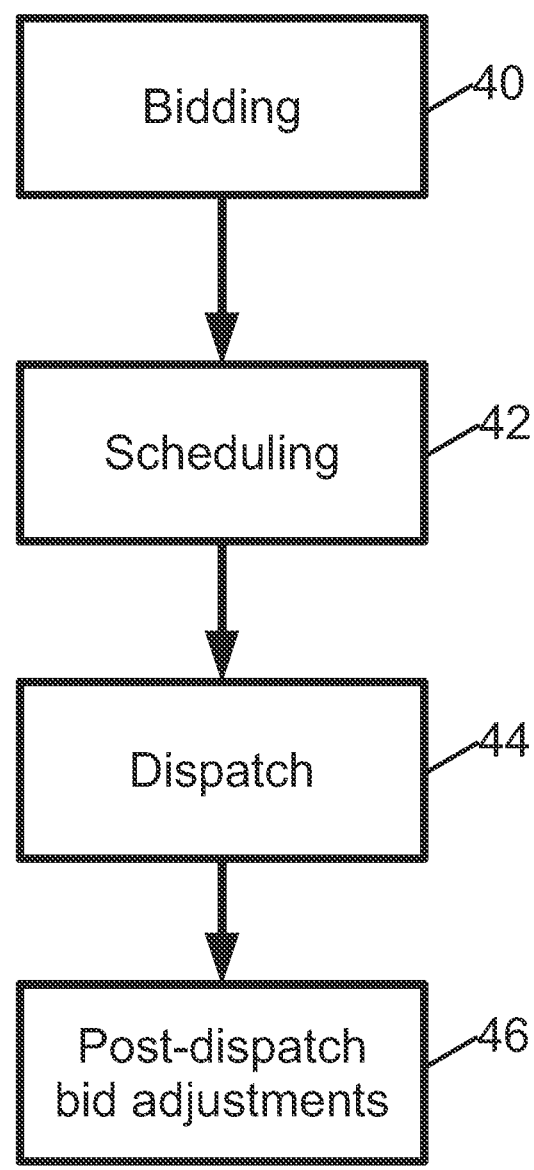
FIG. 3 diagrammatically shows a frequency regulation method suitably performed by the system of FIG. 1.

With continuing reference to FIG. 1 and with further reference to FIG. 3, an illustrative process performed by the system of FIG. 1 for each Time Interval is described. In a bidding operation 40, each energy consuming device 20, 22, 24 submits a bid 34 to the aggregate dispatch controller 14 based on its current state each time period. This bid 34 represents the current level of need for energy over the next time period. The bid contains a state element and a kilowatt (KW) element. The state element indicates how close the device is to its limit (either thermal or time) and the KW element indicates how many KW the device will consume during the time period if it is selected to run. The state is suitably on a scale from 0 to 100 where 100 indicates fully discharged (i.e. must run now) and 0 indicates fully charged (cannot run now, for instance an air conditioner at its minimum temperature/precool point or a water heater is at maximum temp/pre-heat point). Each device 20, 22, 24 can also bid its state as unavailable, which indicates that the device has been removed from the control pool (i.e. aggregation) for the time period. In this case it will indicate 0 for the KW if it is not running or its KW value if it is running (this can be a bid of −99 for instance). Optionally, the bid from a given energy consuming device may be in the form of a Priority Vector including several (state, KW) elements indicative of varying levels of need.

With the bids 34 received, the aggregate dispatch controller 14 performs scheduling in an operation 42. This operation 42 occurs just prior to the time interval(s) for control. The dispatch controller 14 schedules the devices 20, 22, 24 for the scheduling period, by selecting the appropriate value for the control signal 30. All of the device bids 34 are ordered in an array (dispatch stack) so that the dispatch signal can be chosen appropriately. (In the case of multi-element Priority Vectors, this can employ a suitable average of the vector elements). The dispatch control signal 30 is in a range between 1 and 99 inclusive and determines the number of devices that will be scheduled to be on or off as a baseline during the time period. A signal of 99 will turn off the maximum number of devices (since devices with bid state 100 must operate) and a signal of 1 will turn on the maximum number of devices (since devices with bid state 0 cannot operate). The control signal 30 is chosen to optimize the number of devices scheduled to be on or off during the period. Once the control signal 30 is chosen, it is sent to each device 20, 22, 24, that is, the same dispatch control signal 30 is sent to all devices 20, 22, 24 in the aggregation 10 (or in a dispatch group "carved out" of the aggregation). Each energy consuming device 20, 22, 24 then turns on if its state value is higher than the control value and off if its state value is below the control value. The scheduling time period is chosen such that the device states will not change significantly during the period.

In a dispatch operation 44, once the schedule is implemented the dispatch control signal 30 is used to manage loads up or down according to the needs of the dispatching/managing entity 16. Although the initial (base) dispatch signal is determined by the scheduling operation, the dispatch control signal 30 may be adjusted (either higher or lower) during the Time Interval from the current or initial set point in order to turn on or off the appropriate number of devices to meet the objectives of the dispatching/managing entity 16 (such as maintaining adherence to a schedule or any adjustments to the schedule to meet other operational constraints, objectives, or economic efficiency). The amount of the adjustment is determined by summing up the KW of each device that is immediately above the current set point (or below the current set point, depending upon the adjustment direction). In order to meet any designated maximum ramp rate requirement, the dispatch control signal 30 can be adjusted proportionally over the time interval to meet the full ramp. The dispatch control signal 30 is updated at a chosen time interval to maximize performance of the demand management to meet dispatch objectives of the dispatching/managing entity 16. As the control signal 30 changes, those energy consuming devices 20, 22, 24 with states that are closest to the initial dispatch control value (determined in the scheduling operation) are likely to be turned on or off more often than those devices that are closer to states 0 or 100. In this case, the devices whose states are far away from the initial dispatch control value can be removed from the dispatch stack, either for the duration of the scheduling period, or for a shorter time that is appropriate to device constraints (e.g. a compressor can only be turned off/on every 10 minutes). This can also be accomplished by adjusting the original bids 34 up or down to indicate that the device has already received a dispatch signal that modified its original schedule for the period.

Additionally or alternatively, the bid states 34 can be updated during the period to adjust power consumption— this is the post-dispatch bid adjustments operation 46 of FIG. 3. Some devices may have limitations on the number of on/off events that can be performed over a given time period, while other devices can be cycled on/off almost continuously. For devices with constraints, their bids 34 can be adjusted once they are dispatched to prevent subsequent selection and allow for the minimum recovery/rest time period. This allows for resource allocation over long times. Another application of this is that each device 20, 22, 24 may alter subsequent bids 34 to take itself out of the dispatch stack for future time periods (this could also occur within a time period, and entails intra-period bid updates).

The foregoing assumes a single aggregation 10 of energy consuming devices 20, 22, 24 controlled by a single dispatch control signal 30. Horizontally, this aggregation 10 may be divided into different control groups (e.g. all water heaters 20 may form one control group controlled by a single dispatch control signal, all HVAC systems 22 may form another control group controlled by a single dispatch control signal, and so forth). However, these can be treated as different aggregations (in this example, the water heaters 20 are one aggregation, the HVAC systems 22 another aggregation, and so forth).

Additionally, the aggregations can be arranged hierarchically, with one aggregation serving as an effective singular "energy consuming device" in an aggregation of higher level in the hierarchy. Multiple levels of aggregation, dispatch, and control, may be thusly constructed, with the constraints at each level being obeyed. For example, start at the highest level of aggregation and allocate across lower level aggregations (or "sub-aggregations"), treating each lower level aggregation as an effective singular device that submits a bid to the higher level aggregation dispatch controller. This can be repeated recursively down to the lowest level aggregations (i.e. "leaf aggregations" in analogy to a tree structure). As an example, a city may have a temporal constraint/need, and the city-wide aggregate dispatch controller allocates a certain load/response down to each neighborhood (a sub-aggregate), the neighborhoods may then allocate this level downward, while optionally imposing additional constraints at the neighborhood level, and passes downward to a street (circuit) aggregation level, and so forth, possibly terminating at "leaf" aggregations corresponding to buildings. It should be noted that in this arrangement the aggregate dispatch controllers at each level of the hierarchy are logically distinct, but the logically distinct aggregate dispatch controllers may optionally be implemented by a single computer (or other data processing device).

The disclosed demand management applications communicate state and control signals between a dispatch engine and the load/source (referred to herein generically as an "endpoint") to be controlled. When demand management is applied for frequency regulation, changes are rapid (on the order of seconds). Moreover, in embodiments using numerous smaller loads (such as residential water heaters) for the demand response, the scalability of the communications to large numbers of endpoints becomes a limiting factor.

Figure 4:
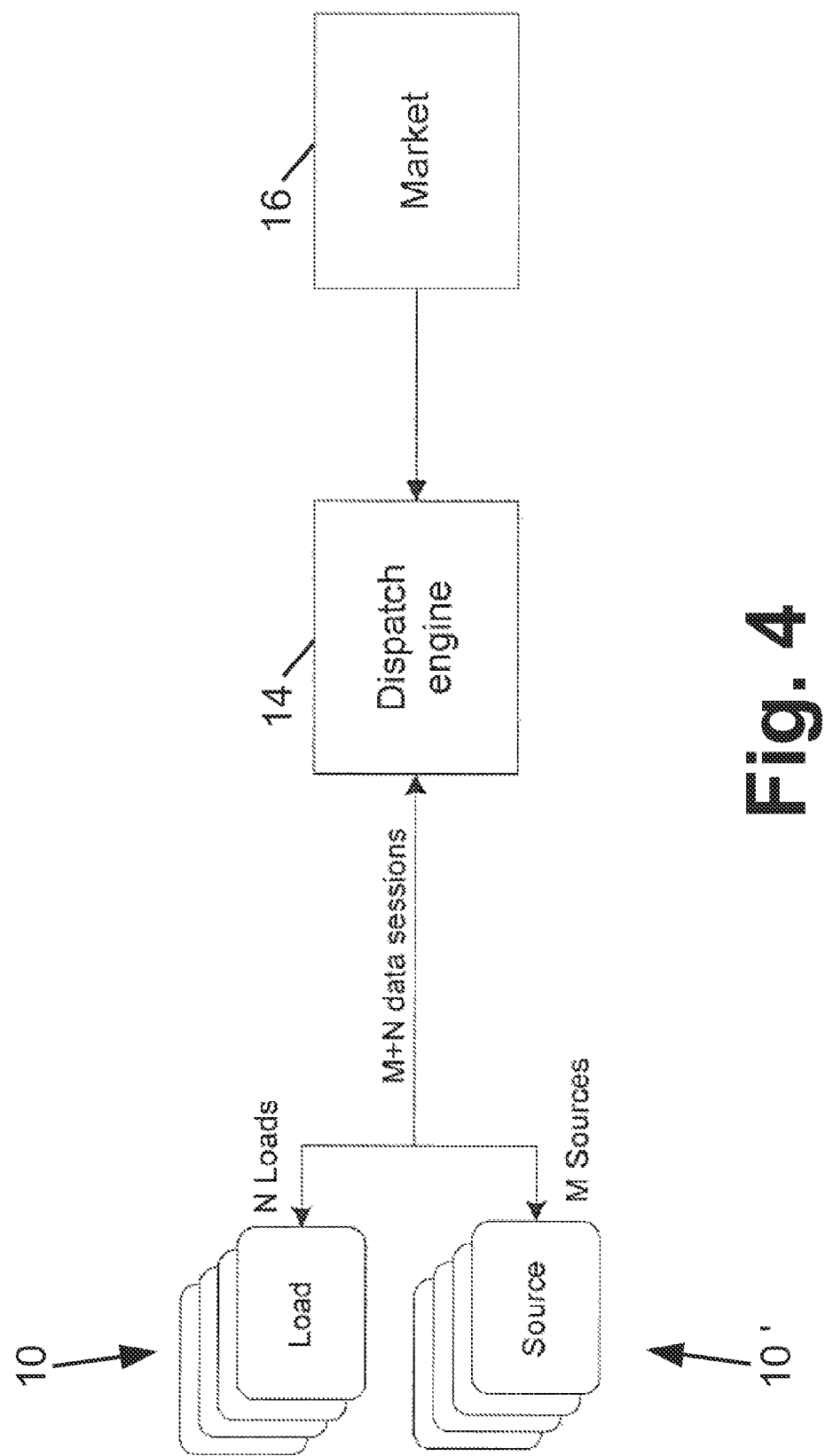
FIG. 4 diagrammatically shows an illustrative variant system similar to that of FIG. 1.

With reference to FIG. 4, the system of FIG. 1 is shown with the number of loads in the aggregation indicated as N loads. For completeness, it is also contemplated that the aggregate dispatch controller 14 (labeled "dispatch engine" in FIG. 4 also controls an aggregation 10' of electrical power sources, e.g. small generators, home-based solar arrays, wind turbines, or so forth. (Such sources are processed as already described for the loads, except that the energy sign is opposite indicating injection of electrical power to the market 16 or other electrical power grid dispatching/managing entity 16. Said another way, an endpoint comprising a source consumes negative electric power from the electric grid, i.e. generates electric power that is delivered to the grid). Thus, in the system of FIG. 4 there are N+M endpoints communicating to the dispatch engine 14, which algorithmically determines endpoints to activate or deactivate as already described. With the architecture diagrammatically shown in FIG. 4, the dispatch engine 14 performs calculations on M+N endpoints, and maintains the same number of data sessions. As an illustrative example, if the endpoints are all 2 KW residential water heaters (for illustrative simplicity), and the controllable capacity fraction of the fleet capacity is 10%, then to obtain 1 MW of controllable power, 5,000 separate water heaters must be controlled. For an advising rate of 1 Hz (i.e., updating the dispatch signal to each end point once per second), and a packet size of 40 bytes, 1.6 Mbs of data through-put will be required. Assuming the load controllers broadcast in an effectively asynchronous manner, many collisions would be expected on the channel thus raising the required sustained bandwidth available to much higher levels. Furthermore, the dispatch engine 14 performs complex optimization calculations on the totality of the data available to it. As the number of endpoints (M+N) attached to a dispatch engine 14 increases, the computation typically increases linearly or logarithmically with the number of endpoints for more complex scheduling algorithms. For the system of FIG. 4, these costs (computational costs at the dispatch engine 14 and communications bandwidth costs) are expected to scale at a cost factor that is greater than unity once a certain threshold on (M+N) is reached. These considerations impose a practical upper limit on the number of endpoints that can be serviced in a cost effective manner. As just pointed out, this is particularly problematic for demand response systems constructed with smaller loads, as a larger total number of smaller loads (i.e. larger N) is needed as compared with a similar system constructed with larger loads to achieve a given controllable power for use in demand response, e.g. for use in frequency control.

Figure 5:
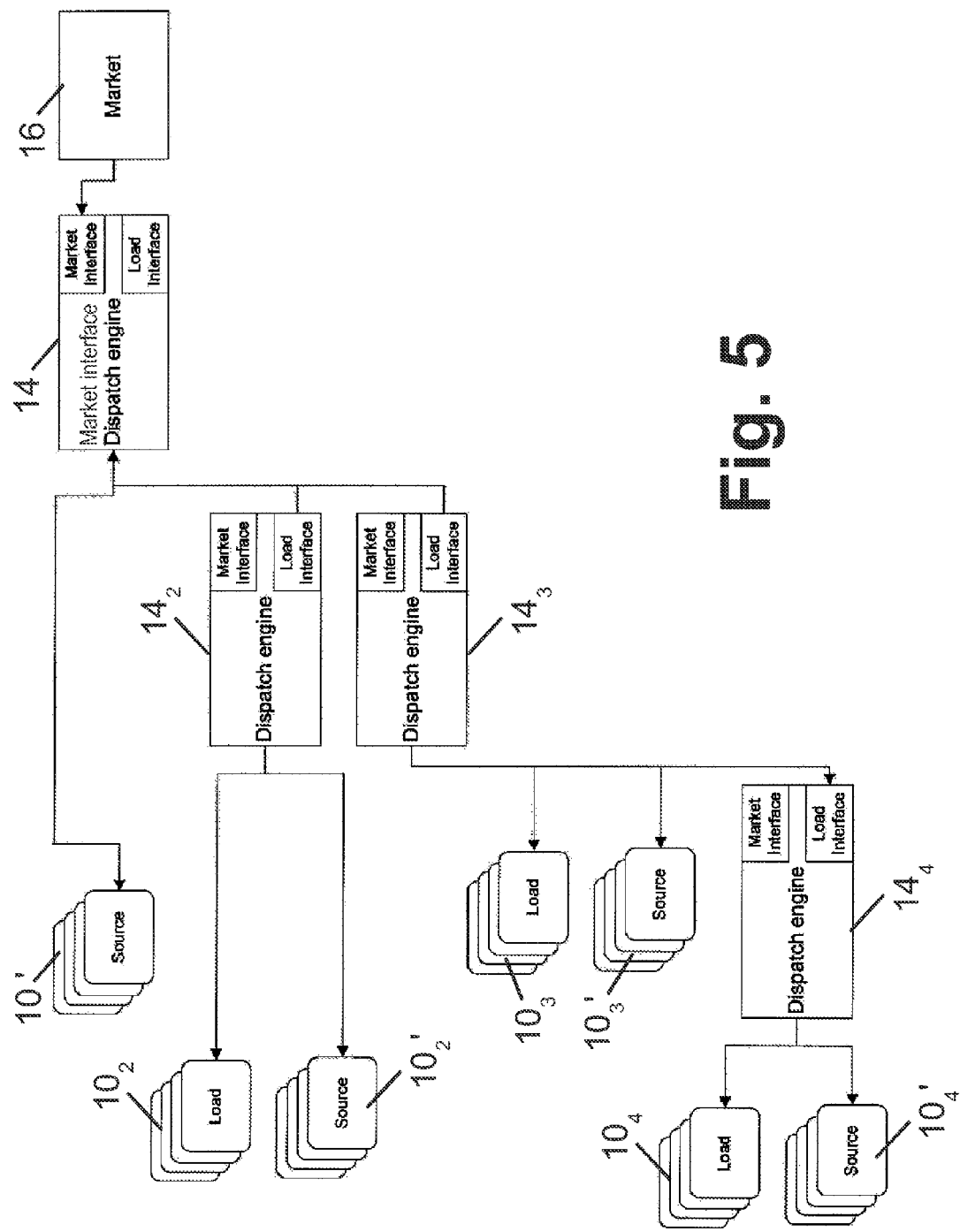
FIGS. 5-7 diagrammatically show alternative embodiments of hierarchical demand response systems as disclosed herein.

With reference to FIG. 5, a hierarchical architecture is described. In this architecture, dispatch engines 14, 14$_2$, 14$_3$, 14$_4$ are arranged in a hierarchy, in which the dispatch engines 14$_2$, 14$_3$, present themselves as endpoints to the dispatch engine 14 which is a market-level dispatch engine communicating with the market 16, and in turn the dispatch engine 14$_4$ presents itself as an endpoint to the dispatch engine 14$_3$. Thus a single dispatch engine (e.g., each of the dispatch engines 14$_2$, 14$_3$, 14$_4$) is an abstracted endpoint, which can mimic the state, capacity and response time of a single endpoint while serving as a dispatch engine to a number of physical or abstracted endpoints. For example, in the architecture of FIG. 5 the dispatch engine 14$_2$ presents itself as an endpoint to the market interface dispatch engine 14 (along with loads 10$_2$ and sources 10$_2$' and the abstracted endpoint comprising dispatch engine 14$_3$ which are also endpoints for dispatch engine 14), and the dispatch engine 14$_2$ also serves as the dispatch engine for endpoint loads 10$_2$ and endpoint sources 10$_2$'. The dispatch engine 14$_3$ also presents itself as an endpoint to the dispatch engine 14, and serves as the dispatch engine for endpoint loads 10$_3$ and endpoint sources 10$_3$' as well as for the abstracted endpoint comprising dispatch engine 14$_4$. Finally, the dispatch engine $14_4$, which is a "leaf" dispatch engine in the illustrative hierarchy of FIG. 5, presents itself as an endpoint to the dispatch engine $14_3$ and serves as the dispatch engine for endpoint loads $10_4$ and endpoint sources $10_4'$. In a hierarchical architecture such as that of illustrative FIG. 5, the number of communications links and endpoint calculations that must be performed can be limited, without complex system design or a priori architecture configuration. Adding 1,000 endpoints onto the system could result in adding a new dispatch engine dedicated to those thousand endpoints, but only increase the market facing dispatch engine endpoint load by a single endpoint or less.

Figure 6:
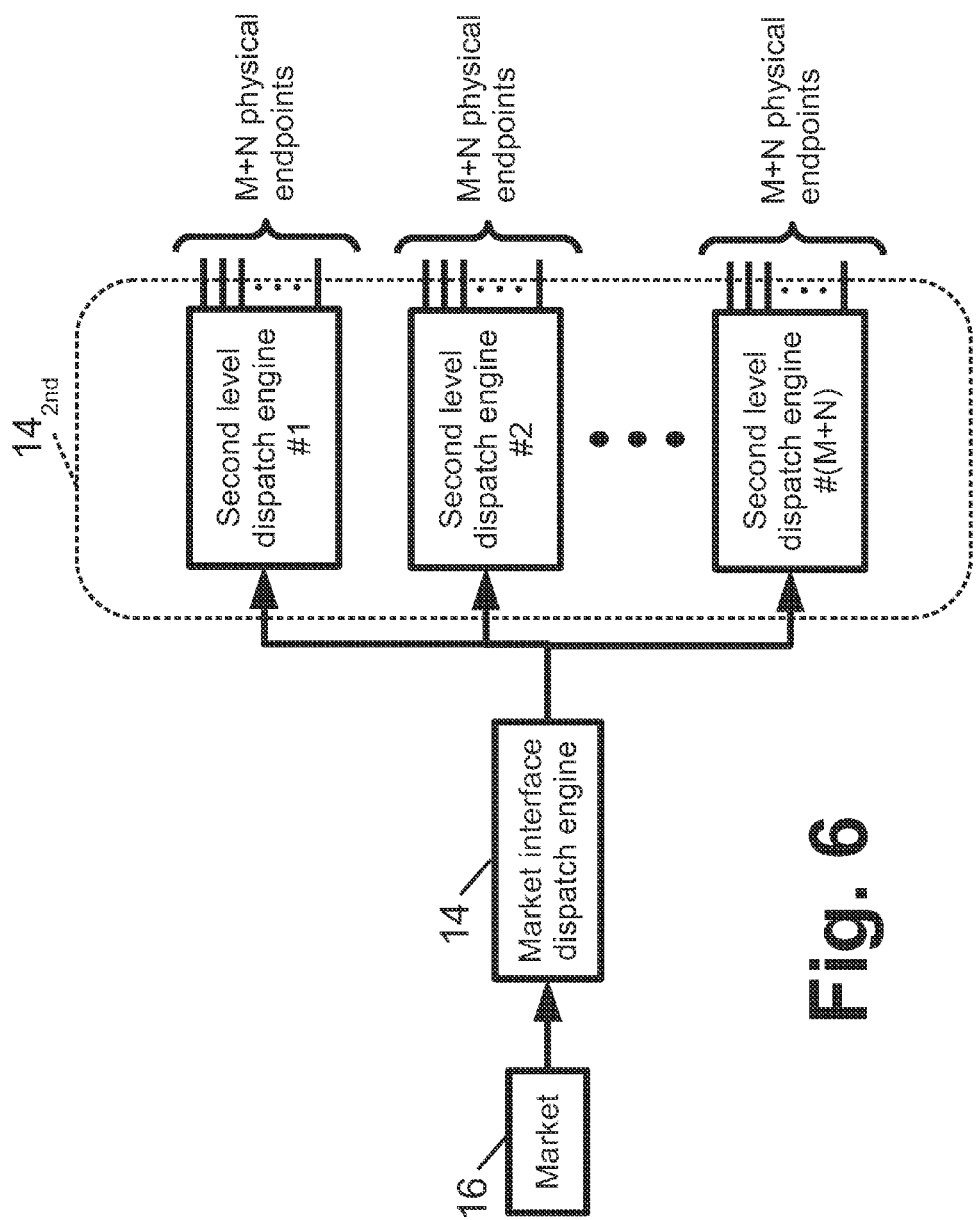

With continuing reference to FIGS. 4 and 5 and with further reference to FIG. 6, in general, the disclosed hierarchical architecture has a cascade depth D which is the longest path of cascaded dispatch engines. By way of illustrative example, a flat (i.e. non-hierarchical) architecture such as that of FIG. 4 has cascade depth D=1 since there is only the single dispatch engine 14 (in fact, no cascading at all in this case). By contrast, the illustrative hierarchy of FIG. 5 has a cascade depth D=3 corresponding to the longest cascade path along the dispatch engines 14, $14_3$, $14_4$. The hierarchical configuration of FIG. 6 has D=2 corresponding to a market-level dispatch engine 14 that communicates with the market 16 and that has (in this illustrative example) only second-level dispatch engines $14_{2nd}$ as abstracted endpoints, with each of the second-level dispatch engines $14_{2nd}$ servicing only physical endpoints. In general, a hierarchical architecture can have D=2, D=3 (as per FIG. 5), D=4, or a larger value for D.

In practice, the cascade depth does not need to be very large, as a cascade depth as small as D=2 already provides massive scalability. For example, with particular reference to FIG. 6, if each dispatch engine can service M+N endpoints (based on considerations already described with reference to FIG. 4), then the hierarchical architecture of FIG. 6 with cascade level D=2 can serve as many as $(M+N)^2$ endpoints, by having (as illustrated) the market interface dispatch engine 14 service M+N abstracted endpoints (i.e. M+N second-level dispatch engines $14_{2nd}$) each of which in turn services M+N physical endpoints (i.e. M+N physical loads and/or sources). Generalizing this analysis, a hierarchical architecture with cascade depth D can service as many as $(M+N)^D$ physical endpoints. To give a quantitative example, if a single dispatch engine can service 1000 endpoints, then a hierarchy with cascade depth D=2 can service a thousand times more endpoints (i.e. $1000^2$ endpoints, i.e. a million endpoints) while a hierarchy with cascade depth D=2 can service $1000^3$ endpoints, i.e. a billion endpoints.

A consideration in the disclosed hierarchical architecture is the latency of the system. When dispatch engines are cascaded in the disclosed hierarchical architecture, the speed at which a signal from the market 16 will propagate to the physical endpoints, especially those passing through several intermediate dispatch engines, is affected. For example, in the illustrative architecture of FIG. 5, a change in the signal from the market 16 must propagate through each of the dispatch engines 14, $14_3$, $14_4$ to reach the endpoints $10_4$, $10_4'$. In principle, the added latency of the system increases by D·SL, where D is the number of cascaded dispatch engines (i.e., the cascade depth D) and SL is the system latency inherent for an endpoint-to-dispatch engine communication session. As already noted, D is typically small, e.g. D=2 or D=3 is sufficient for most purposes.

In one suitable approach for mitigating the added latency D·SL, the advising rate of an endpoint can be made non-uniform. For example, if the design-basis advising rate for an endpoint is SL=1 Hz, then in this approach an abstracted endpoint may be configured to call in to the controlling dispatch engine at a rate of 2 Hz rather than the 1 Hz that a physical endpoint would, allowing set point changes to be propagated from the market at the desired 1 Hz rate for a hierarchy of cascade depth D=2. Under this illustrative scheme the overhead for servicing an abstracted endpoint is twice the overhead for a physical endpoint, but the abstracted endpoint can service any number of physical endpoints (limited by the considerations described herein with reference to the flat hierarchy of FIG. 4). For a hierarchy of cascade depth D=3 (such as that shown in FIG. 5), the advising rate of each abstracted endpoint is suitably increased to SL=3 Hz. In principle, this approach imposes an upper limit on the cascade depth D since the required advising rate for a hierarchical architecture of depth D is D Hz; however, as already explained most hierarchical architectures are expected to have small cascade depth (e.g., D=2 or D=3) so that this is not a significant limitation. Moreover, the dispatch engines are typically computers, network servers, or other designated electronic data processing devices that include (or can readily be fitted with) fast data connections, e.g. wired and/or wireless Ethernet connections with data speeds of megabits-per-second or higher. Thus, accelerated system latency of SL=2-3 Hz for these connections suitable for frequency regulation applications (for which overall demand response should be on the order of seconds) is readily achieved.

An additional or alternative approach for addressing the added latency D·SL is to implement "on-change" communications on each abstracted end point. In this approach, the abstracted end point communicates data on a compressed schedule, only notifying the upstream dispatch engine of changes. Each dispatch engine, including those operating as an abstracted endpoint then continue to manage the physical endpoints at the design-basis advising rate (e.g., 1 Hz in these examples).

Under the disclosed hierarchical architecture, a single interface to the market is presented externally (labeled as the market interface dispatch engine 14 in FIGS. 5 and 6), so to the market 16, the difference in the disclosed hierarchical architecture as compared with a flat architecture (e.g. FIG. 4) is transparent. In this way, scalability of the demand response system is simplified, as it requires no modifications by third parties (e.g. the market 16).

In one suitable configuration, each endpoint has three parameters: a state, a capacity and a rate. The state describes how much of the resource is being used. For example, in the case of a water heater, the maximum state is when the water heater cannot consume more energy, which occurs when the water temperature in the water heater tank reaches its upper limit. The minimum state is when the water in the water heater tank reaches a minimum temperature threshold at which heating must commence. The numeric values corresponding to the maximum and minimum states can be arbitrary, with 0 and 100 being used in illustrative examples herein. While the state variable represents how much of the resource is being used, the capacity variable represents the size of the resource, i.e. the maximum power that the resource can consume from the electric grid (or supply to the grid, in the case of a source, i.e. for a source the capacity is a suitably negative value). For the water heater example, the capacity could be the kilowatt-hour (KWH) the heater can absorb to bring it from the minimum state to the maximum state. A third parameter is the allowable rate of change. A load or source can only change its state at a limited rate, and it is this rate that defines how effectively revenue (in terms of power consumption or supply marketable for demand response purposes) can be captured from the device. A water heater's rate would be equivalent to the power rating of its heating elements. More generally, the maximum rate of change is the maximum rate of change in power consumed by the endpoint from the electric grid (or supplied to the grid from the endpoint the case of a source). The state variable is the only variable in the illustrative state/capacity/rate paradigm that has temporal meaning, as the capacity and rate are constant with time, or constant with respect to the current state. Different or additional control parameters provided by the load or source are also contemplated, such as a further parameter to indicate predicted usage over the next N time intervals, and/or a further parameter comprising a confidence or volatility value that relates to how consistently the temperature readings and dispatch patterns keep the unit within the desired temperature range, and/or a further parameter providing a metric of network latency and reliability measured from the load perspective, or so forth.

In one demand response approach, the market interface dispatch engine 14 comprises a computer executing an algorithm implemented by software which determines how to turn endpoints (including both physical endpoints and abstracted endpoints) on or off to achieve a power consumption set point. To this end, the dispatch engine 14 shares a forecast of what its maximum and minimum operating state can be, to the market 16 (i.e. to the entity creating the power consumption set point). This forecast may be referred to as a bid (as the dispatch engine 14 is "bidding" to sell its power consumption flexibility to the market 16 for use in frequency control or other demand response), and may be performed at specific time intervals. If the dispatch engine 14 controls loads with nameplate (i.e. rated or nominal) total system capacity of 100 KW, e.g. water heaters totaling 100 KW rated capacity, and the scheduled controllable demand at a given time interval is expected to be 10% of this total nameplate capacity, then the dispatch engine 14 suitably makes a day-ahead bid of 20 kW representing the range of +/−10 KW. If the state of those same water heaters at some point during the following day is such that the majority are near 100 state, the five minute bid may be modified to a lower capacity such as 15 kW to account for fewer units being available in that hour. Thus the real time bid takes into account the current, realized aggregate state of the system, and the rate that the state may be changed.

Now consider a "downstream" dispatch engine that presents itself as an abstracted endpoint to the market interface dispatch engine 14 (or other "upstream" dispatch engine in the hierarchy). To provide a concrete example, consider the hierarchy of FIG. 5, with the "upstream" dispatch engine being the market interface dispatch engine 14 and the "downstream" dispatch engine being the dispatch engine $14_3$. Under this illustrative approach, the real time bid that is calculated by the downstream dispatch engine $14_3$ corresponds, from the viewpoint of the upstream dispatch engine 14, to the state of an endpoint represented by the downstream dispatch engine $14_3$. The capacity of the downstream dispatch engine $14_3$ is the aggregate capability to modify the controlled end devices $10_3$, $10_3'$, $14_4$ (where the capacity includes the capacity of any abstracted endpoints such as the further-downstream dispatch engine $14_4$). For example, if the expected controllable capacity of the downstream endpoints $10_3$, $10_3'$, $14_4$ is 10% of the total rated capacity, the capacity of the abstracted end point formed by the downstream dispatch engine $14_3$ is then 10% of the aggregate capacity of all of the attached endpoints $10_3$, $10_3'$, $14_4$. The downstream dispatch engine $14_3$ suitably accounts for rate limitations of the endpoints $10_3$, $10_3'$, $14_4$, and for this purpose it has rate information calculated that can be used in the abstracted endpoint context. Thus the information needed to abstract the downstream dispatch engine $14_3$ as an endpoint is readily available to the downstream dispatch engine $14_3$.

A given dispatch engine may communicate upstream via a communication path for communicating with the market 16 (in the case of the market interface dispatch engine 14), or via a communication path communicating as an abstracted endpoint with an upstream dispatch engine. The communication path via which the market interface dispatch engine 14 communicates with the market 16 is defined by the communication protocol employed by the market 16. The communications path via which a downstream dispatch engine communicates with an upstream dispatch engine can use the same communication protocol as is used for communicating with the market 16, as the same content is communicated: in both cases, the downstream dispatch engine transmits its state, capacity, and rate parameters (and additional parameters, if employed) to the upstream component (either to the market 16 in the case of the market interface dispatch engine 14, or to an upstream dispatch engine in the hierarchy). If the added latency D·SL of the abstracted endpoint to dispatch engine communications is addressed by "on-change" communication, then the packet is suitably marked by metadata to indicate that the packet originated from an abstracted endpoint.

In addition to the real time bid, a bid is constructed for a more distant period of time, such as day-ahead or week-ahead. These bids are effectively estimates or predictions of what the state will be for that more distant time period. There are two potential locations for this prediction to be constructed: within the market interfacing dispatch engine 14, or within the end points (e.g., downstream dispatch engines). If computed at the market interfacing dispatch engine 14, the more distant prediction suitably uses historical state data from the attached endpoints (physical and abstracted), and algorithms accounting for time-of-day, day-of-week, weather, holiday, and other parameters. If computed at the endpoint, less sophisticated data is available, but typically at a higher resolution. For example, a water heater endpoint has a great deal of cycle-by-cycle data on its own heating elements, and can thereby effectively predict its expected state for a future time slot. An abstracted endpoint (i.e. downstream dispatch engine) suitably performs a prediction calculation based upon its historical state data, similarly to predictive analyses performed by market interfacing dispatch engine 14. It is also contemplated to employ a hybrid approach, such as computing a day-ahead prediction at the market interface dispatch engine 14 and at each endpoint, collecting and aggregating the endpoint predictions at the market interface dispatch engine 14, and averaging or otherwise combining this aggregated prediction with the day-ahead prediction separately computed at the market interface dispatch engine 14.

Figure 7:
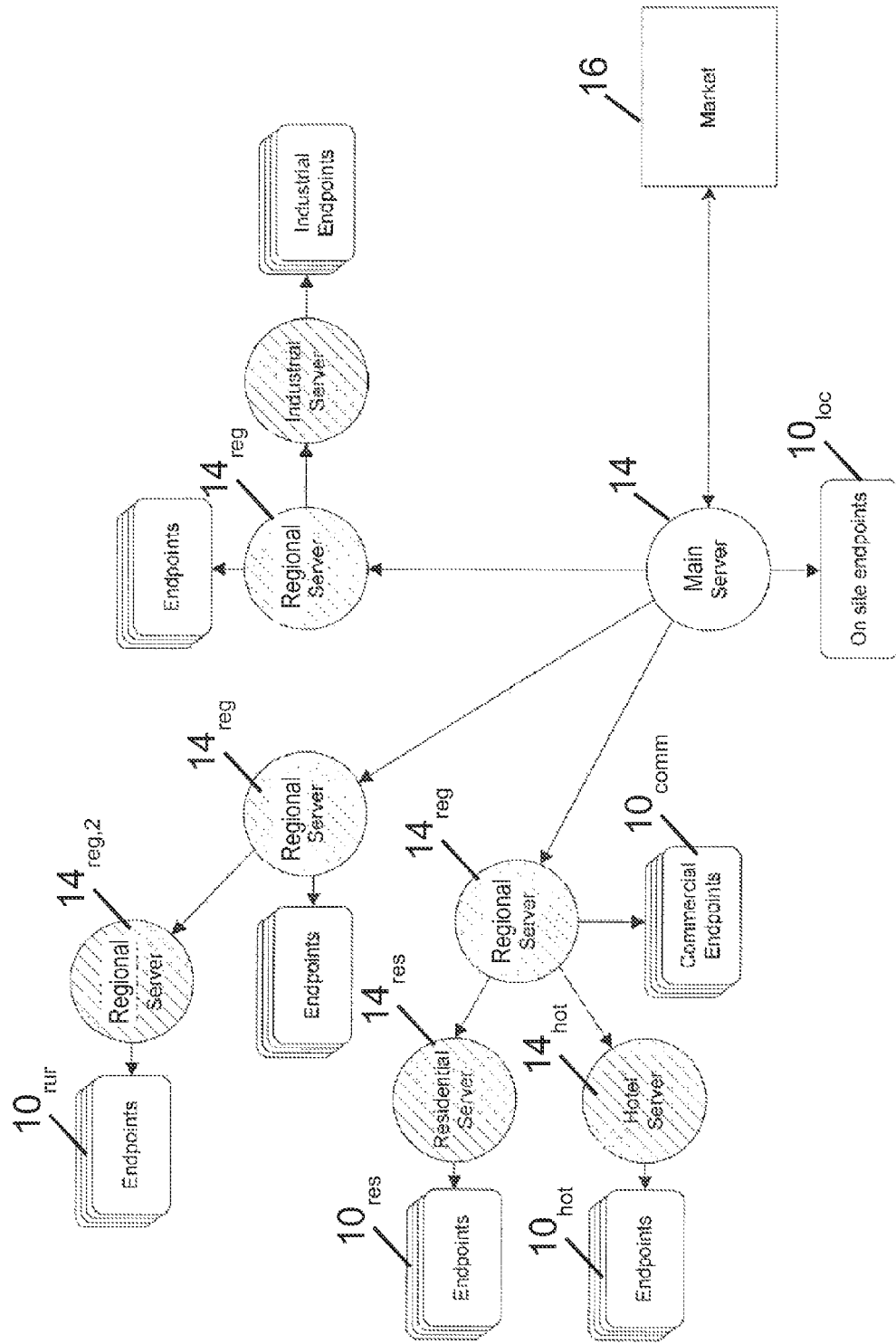

With reference to FIG. 7, the physical layout of the hierarchical demand response system is optionally constructed to leverage spatial relationships between endpoints and the availability of high bandwidth, low latency, network connections. In one approach, the market interface dispatch engine 14 is suitably implemented as an Internet-based (or other computer network-based) server, which dispatches via the computer network to downstream abstracted endpoints comprising regional dispatch engines $14_{reg}$ implemented as remote servers or computers and (optionally) to local endpoints $10_{loc}$, located locally to the market interface dispatch engine 14. The server embodying the market interface dispatch engine 14 can employ a more costly Internet Protocol (IP) connection that has robust reliability and large bandwidth. Since this is the primary channel through which revenue for the provided demand response capacity is obtained, an IP connection is cost-effective for the market interface dispatch engine 14. The market interface dispatch engine 14 interfaces with the immediately downstream (in the hierarchy) abstracted endpoints, shown as the cross hatched circles in FIG. 7. These first order endpoints are suitably regional dispatch engines $14_{reg}$ located physically near the devices they serve, to reduce latency and conserve bandwidth in areas with limited external connections, while still being located on high quality-of-service network lines such as co-locating with the cable modem termination system. By doing so, bandwidth usage on trunk lines is limited. The regional dispatch engines $14_{reg}$ connect in the hierarchy to second order abstracted endpoints and so on.

In illustrative FIG. 7, various configurations are shown for these downstream endpoints. For example, in one area, a regional dispatch engine $14_{reg}$ connects with a further-downstream regional dispatch engine $14_{reg2}$. This connection can be a low value, low reliability link, for example to a more rural region containing rural endpoints $10_{rur}$ such as loads at farms or dairies that contribute less to the demand response capacity (and hence contributes less to the revenue generated by the demand response system, so that the link is preferably relatively inexpensive). To reduce latency, the further-downstream regional dispatch engine $14_{reg2}$ presents itself as an endpoint to one of the regional dispatch engines $14_{reg}$. If the communications from the further-downstream regional dispatch engine $14_{reg2}$ were to fail, the observable effect would be the loss of a single endpoint on the upstream regional dispatch engine $14_{reg}$, which would then pass the information along to the main (market interface) dispatch engine 14 as a decrease in capacity. To further mitigate the effect of a lost link between such a remote area, a backup wireless channel could be provided. Since only three parameters are transmitted for the abstracted endpoint $14_{reg2}$, the cost of such a link is relatively low.

With continuing reference to FIG. 7, examples of connections for different load types, e.g. a commercial, residential, hotel, and industrial load types, is shown. In FIG. 7 one of the regional dispatch engines $14_{reg}$ is attached directly to commercial endpoints $10_{comm}$, but is abstracted from residential endpoints $10_{res}$ by a downstream residential dispatch engine $14_{res}$ and is abstracted from hotel endpoints $10_{hot}$ by a downstream hotel dispatch engine $14_{hot}$. The usage patterns and state predictions of different classes of endpoints may benefit from different dispatching algorithms. By assigning these classes to a dispatch engine specific to their type, the implementation of different types of algorithms can be simplified and expedited, and the accuracy of the forecasted state can be enhanced.

For robustness, each endpoint including abstracted endpoints suitably has an assigned list of backup dispatch engines with which to communicate. For example, if the hotel dispatch engine $14_{hot}$ abstracted endpoint communications were to fail, the endpoints $10_{hot}$ served by the hotel dispatch engine $14_{hot}$ can suitably be routed to the upstream regional dispatch engine $14_{reg}$, and/or a parallel server in the hierarchy such as the residential server $14_{res}$. In some embodiments, to keep a large failure from overburdening dispatch engines, each dispatch engine is able to reject a request for an incoming connection. By such approaches, an automatic rerouting across any dispatch engines which go down can be made. In the event that the market interface dispatch engine (i.e. main server 14) fails, the abstracted endpoints are optionally designed to automatically reconfigure another dispatch engine to be the new market interface. A backup list distributed to all dispatch engines suitably identifies the downstream dispatch engine that becomes the new market interface, and any authorization codes required for interfacing with the market 16 are suitably stored at each dispatch engine that can serve as the backup market interface. A failure of the market interface dispatch engine 14 is arbitrated by way of the backup list so that only a single interface to the external market is maintained at any time.

The disclosed hierarchical architecture facilitates adding new endpoints, or entire service areas to a frequency regulation system. To this end, a local dispatch engine can be updated to recognize the new endpoint, and the change to capacity can be propagated through to the market facing dispatch engine in a transparent manner. Another advantage is that any errors that may be incurred during the addition of a load can be firewalled to the downstream dispatch engine servicing the added load, so as to isolate the error from the remainder of the system. For the addition of a service area, a local dispatch engine can be (added if needed and) configured to service the physical endpoints in the additional service area. (The additional service area may be defined geographically or in another way, e.g. the additional service area may be the addition of loads owned by a given company or other entity, or the additional service area may be a new type of load that is added to the demand response system.) The ramp-up of a newly added dispatch engine or service area can be done gradually to limit stresses on the overall demand mode system. For example, in one approach a new dispatch engine is initially brought online while remaining isolated from the remainder of the demand load system. The isolated newly online dispatch engine begins to estimate its state and capacity as the serviced endpoints operate, but it does not attach itself to any upstream dispatch engine during this volatile period (or, if the added service area is being serviced by an existing dispatch engine, the dispatch engine during ramp-up services the added service area in isolation from other endpoints serviced by the dispatch engine). When state and capacity estimates become stable, the abstracted endpoint (i.e., new dispatch engine or new service area serviced by an existing dispatch engine) is then connected with an upstream dispatch engine or with the other endpoints serviced by the existing dispatch engine. This ramp-up approach segregates the added portion of the system during a validation period prior to coming fully online.

The disclosed hierarchical demand response system architecture is also advantageous for servicing emerging "micro-markets". It is expected that over time the electric power grid will have an increasingly large portion of its energy come from small, local, and intermittent power sources such as wind turbines and solar panels. A possible consequence of this is that grid instabilities may become more localized. The disclosed hierarchical architecture provides localized dispatch engines that are well-suited for servicing localized service areas (where, again, "localized" can be in terms of geography, load type, or based on some other criterion). This locality can be leveraged to stabilize a local subset of the grid, in cooperation with the market maker 16, by placing the micro-market under a designated dispatch engine (or, more generally, under a designated branch of the hierarchical architecture, e.g. including several "leaf" dispatch engines under control of a regional dispatch engine). Physically locating a dispatch engine locally provides various benefits, such as: reducing latency in communications which facilitates more rapid bidding or other response to market changes; increasing robustness to local communications outages and cataclysmic events; controlling bandwidth consumption on trunk lines by moving most communications onto single provider networks which allows bandwidth costs to be reduced; and providing for capability in highly localized markets.

Figure 8:
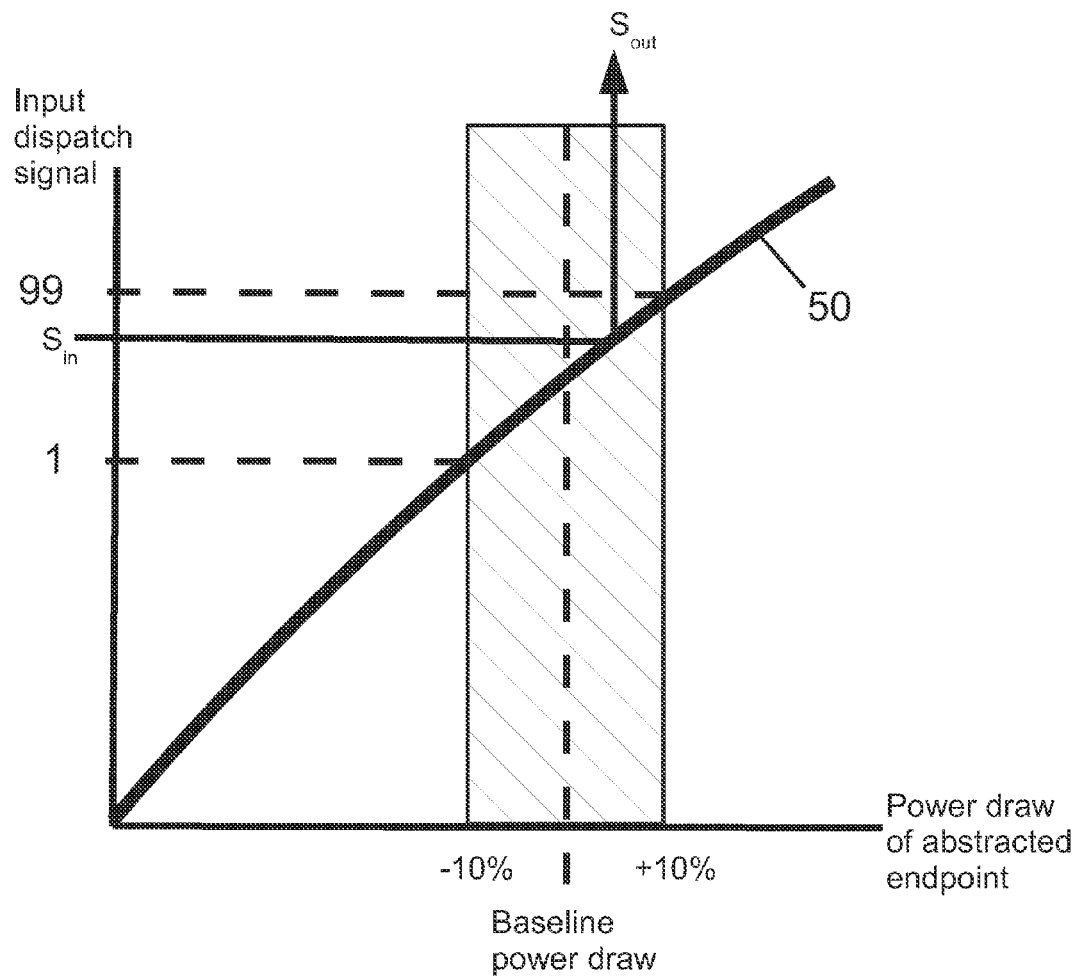
FIG. 8 diagrammatically illustrates an operating curve for an endpoint along with diagrammatic indications of the baseline power draw of the endpoint, the bid demand, the control signal ($S_{in}$) received at the serving dispatch engine, and the dispatch signal ($S_{out}$) generated by the servicing dispatch engine.

With reference to FIG. 8, an abstracted endpoint (i.e. downstream dispatch engine) is not a strictly "on"/"off" endpoint. By way of illustrative example, consider the aforementioned embodiment in which the abstracted endpoint has three parameters: a state, a capacity and a rate. Further assume that the capacity available for demand response is ±10% of the scheduled power draw. As diagrammatically shown in FIG. 8, the capacity and rate define an operating curve 50 for the abstracted endpoint. As shown in FIG. 8, the operating curve is not necessarily linear. The state parameter describes how much of the resource is being used, and corresponds to the baseline or scheduled power draw. Said another way, the state identifies the baseline point along the operating curve 50 at any given time.

As diagrammatically shown in the lower inset of FIG. 8, the dispatch engine 14x receives an input dispatch signal $S_{in}$ from the upstream dispatch engine (or from the market 16 in the case of the market interface dispatch engine 14), and generates an output dispatch signal $S_{out}$ sent to the loads serviced by the dispatch engine 14x. For illustrative example, both dispatch signals are assumed to be in a range 1-99 where 1 calls for as little power as possible while 99 calls for maximum power draw. The input dispatch signal $S_{in}$ calls for the dispatch engine 14x to provide a power draw somewhere within its bid demand of ±10% of the baseline power draw. To achieve this requested power draw, the dispatch engine suitably constructs the output dispatch signal $S_{out}$ so as to turn on or off a sufficient number of the physical endpoints connected to the dispatch engine 14x. In one suitable approach, each physical endpoint provides its priority vector, and at the dispatch engine 14x the priority vectors are arranged into a dispatch stack and $S_{out}$ is chosen to turn on the requisite number of physical endpoints. Thus, even though the loads connected to the dispatch engine 14x are either on or off, the total draw provided by the dispatch engine 14x is some value along the continuous operating curve 50 selected by the computed output dispatch signal $S_{out}$.

In the foregoing example it is assumed that the physical endpoints are on/off devices, which is appropriate for devices such as hot water tanks and dishwashers. However, the approach is readily extended to physical endpoints having a selectable multi-level or continuous power level. Such a load describe itself similarly to the way the abstracted endpoints do, e.g. using three parameters: a state, a capacity and a rate.

Figure 9:
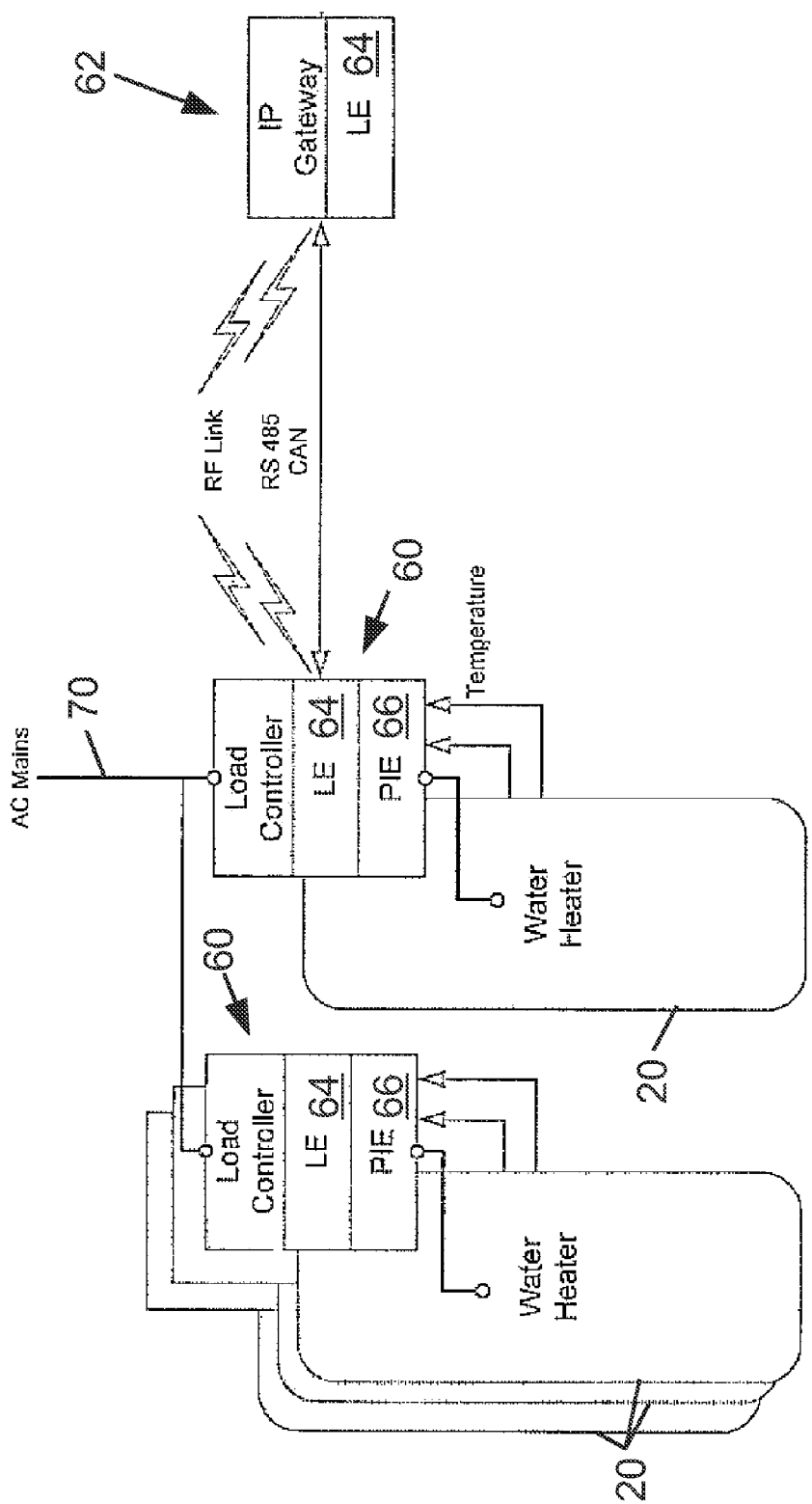
FIGS. 9 and 10 diagrammatically show illustrative load controllers and their operative interconnections in accord with embodiments disclosed herein.
Figure 10:
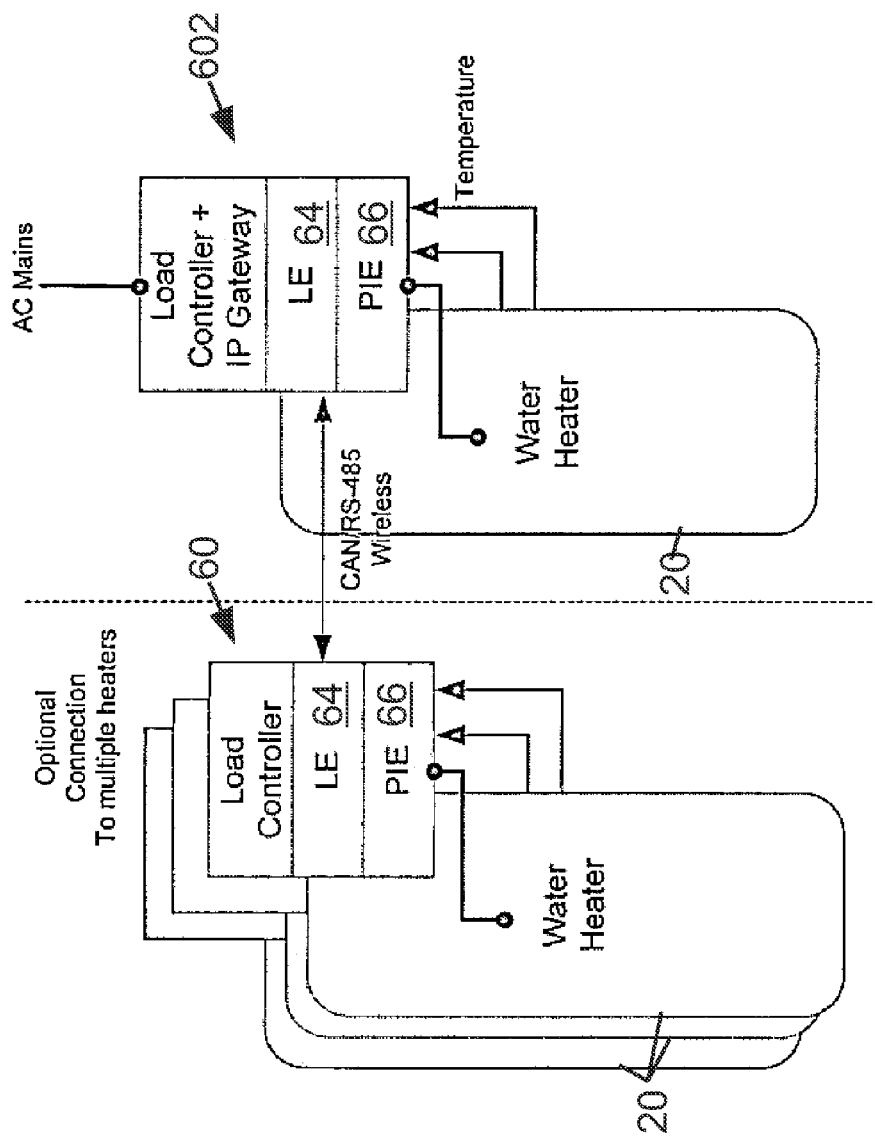

With returning reference to FIG. 1 and with further reference to FIGS. 9 and 10, at each physical endpoint 20, 22, 24 a load controller 60 generates the bid 34. In some illustrative embodiments disclosed herein, the communication link 32 includes the Internet, and the illustrative load controllers 60 leverage symmetry in the data-links employed between the load controller 60 and an Internet Protocol (IP) gateway 62. The illustrative controllers 60 also provide for the mains voltage/high current switching mechanism to be modular in nature. To this end, the illustrative load controller 60 includes two modular elements: a logic element (LE) 64 and a power interface element (PIE) 66. Each element 64, 66 is optionally contained in its own enclosure, connected together through a low cost, low voltage connector.

In the illustrative example, the logic element 64 contains a processor, communications interfaces, and state measurement devices such as temperature sensors. All firmware deployed on the load controller 60 is contained within the logic element 64. The logic element 64 does not switch or contain high voltage from the AC mains 70 (e.g., 110 volt or 220 volt power in typical U.S. residential settings), allowing the logic element 64 to be a low-voltage component that is not subject to more rigorous compliance testing required for high voltage components. That is, the logic element 64 is an electronic data processing device that does not contain AC electric power capable of powering the electric power-consuming load. The logic element 64 has IP network connectivity, and can operate without the presence of the power interface element 66. Thus the logic element 64 can operate as a load controller when connected to a physical logic element 66, and can operate as an IP gateway either with or without connection to a physical logic element 66. This allows for the logic element 64 of a single design (hardware and firmware) to serve as a standalone, IP linked, load controller application, or as a non-IP linked load controller, or as an IP gateway. Additionally, the logic element 64 attached to the power interface element 66 can operate as a load controller for one hot water heater 20 and also as an IP gateway for load controllers of other hot water heaters 20.

With particular reference to FIG. 9, a configuration is shown in which the IP gateway 62 comprises a standalone logic element 64 that is not connected with any power interface element. Each controller 60 comprises connected logic and power interface elements 64, 66 in which the logic element 64 is in wireless communication with the IP gateway 62 via a radio frequency (RF) link, RS-485 link, CAN link, or so forth. With particular reference to FIG. 10, an alternative configuration is shown in which an integrated load controller/IP gateway element 602 comprises connected logic and power interface elements 64, 66 in which the logic element 64 is operating both as the load controller and as the IP gateway. In the configuration of FIG. 10, other load controllers 60 communicate with the integrated load controller/IP gateway element 602 via CAN, RS-485, or another wireless protocol.

In some embodiments, a single logic element can interface to multiple different types of power interface elements. By way of illustrative example, a power interface element (PIE) design disclosed herein is configured for water heaters operating at 240 VAC, single phase electrical supply, but other PIE designs are contemplated, such as for multiphase supplies, different voltages, different load types, and so forth. Various such PIE designs are optionally configured to present an identical interface to the logic element, so that an installer merely selects the appropriate PIE for the load to be fitted for operation in the demand response system. This allows a single logic element design to control a variety of different types of loads. By segregating power interface aspects in the PIE element, the switching element also can be sized appropriately for the load device under control.

In one physical configuration, the load controller 60 comprises three circuit card assemblies: a circuit card embodying the logic element 64; a circuit card embodying the power interface element 66; and an optional cellular module daughter card (CMDC). Alternatively physical configurations are also contemplated, such as constructing one or both elements 64, 66 using multiple cards.

Figure 11:
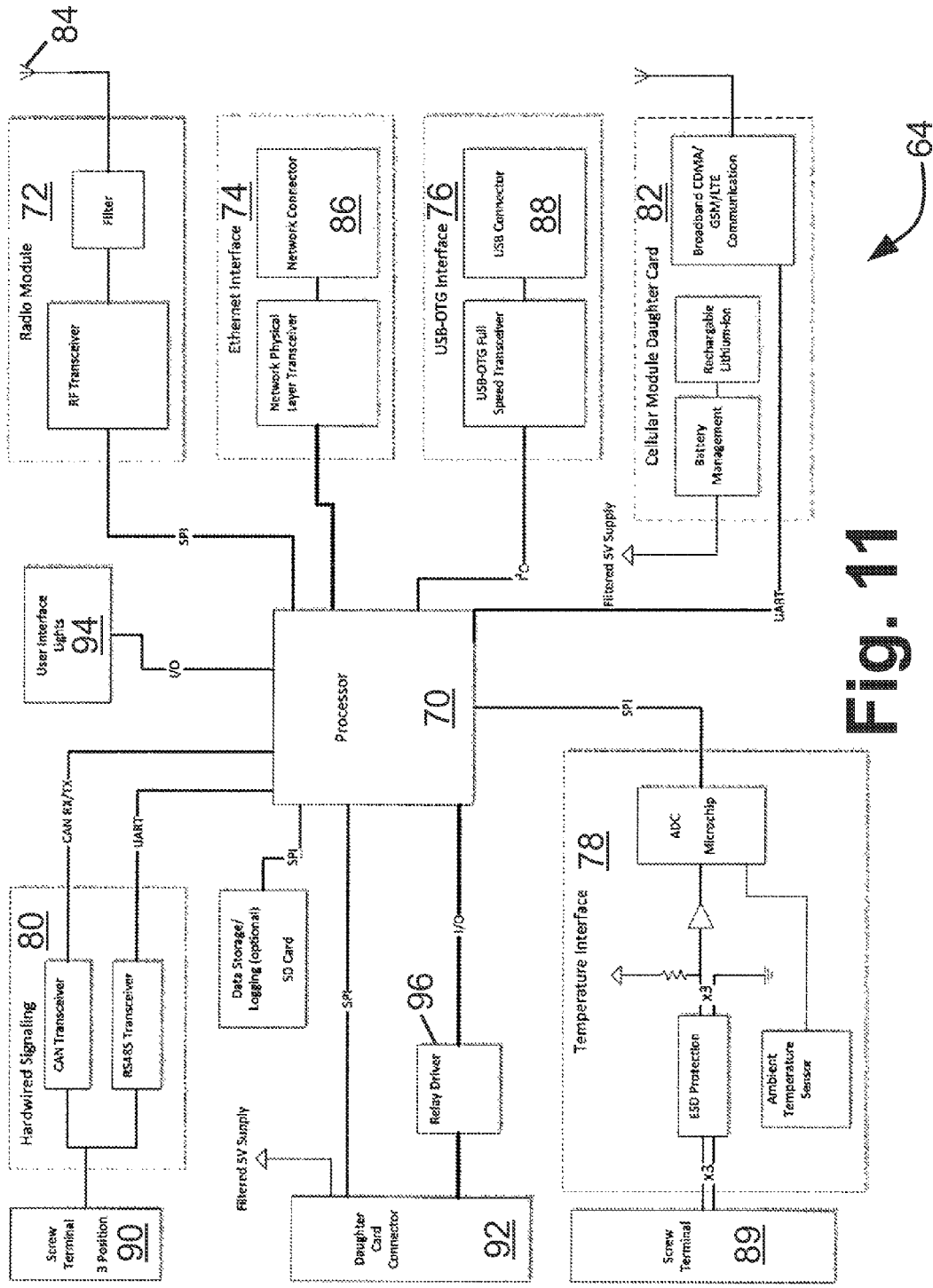
FIGS. 11-13 diagrammatically show aspects of an illustrative load controller disclosed herein.

With reference to FIG. 11, a high-level schematic of an illustrative embodiment of the logic element 64 is shown. The illustrative logic element 64 of FIG. 11 includes a processor 70 and five interface blocks: a radio module 72; an Ethernet interface 74; a Universal serial bus on-the-go (USB-OTG) interface 76; a temperature interface 78; and a hardwired signaling interface 80. The illustrative logic element 64 of FIG. 11 also provides an optional CMDC interface 82. The radio module 72 provides for low bandwidth communications between a load controller and gateway, and includes a suitable antenna 84. The Ethernet interface 74 provides access to a wired IP network via a network connector 86. The USB-OTG interface 76 provides a communications port with a USB connector 88 (e.g. a micro-USB connector for compactness) for setting and reading system configuration by a computer, and can also serve as a host port to interface to a cellular modem or flash memory. The temperature interface 78 connects with thermistors, thermocouples, or other temperature sensor elements via a screw terminal 89 or other suitable interface, and is configured to record both ambient and external thermistor temperatures. The hardwired signaling interface 80 provides a low cost (e.g. two-wire) communications channel between a load controller and gateway via a screw terminal set 90. The processor 70 may, for example, be a microprocessor or microcontroller; more generally, however, any processor with suitable interfacing (e.g. an Ethernet media access layer, universal asynchronous receiver/transmitter (UART), controller area network (CAN) interfaces) would be suitable. A daughter card interface 92 comprising a multi-pin DTM connector or other suitable interface provides the physical interface for connecting the logic element 64 to the PIE 66, with suitable signal drivers. A suitable user interface is also provided, which in the illustrative example of FIG. 11 includes a set of user interface lights 94 to communicate to an end user or installer that communication is occurring and that the device is functional.

With continuing reference to FIG. 11, the radio module 72 wirelessly transmits short packets of data between a load controller and the IP network gateway. Advantageous characteristics for this module 72 include low bandwidth for reducing cost and increasing RF sensitivity, sub-GHz carrier frequency for low absorption from walls, and operation in an unlicensed band, such as 433 or 915 MHz. An optional filter such as a surface acoustic wave (SAW) band-pass filter is tuned for the specific frequency of operation. The data rate of such a configuration is suitably in a range of 50 to 100 kbps.

The Ethernet interface 74 converts signaling from the media access layer contained in the processor 70 to physical signaling transmitted over a suitable linkage. The illustrative Ethernet interface 74 includes a physical layer transceiver (PHY) and the connector jack 86. The required communication rate is low, e.g. less than 10 Mbit/s. In an alternative design, the Ethernet interface 74 is not integrated into the logic element 64 but rather its functionality is implemented as a dedicated IP gateway constructed as a separate module.

The USB-OTG interface 76 allows for the logic element 64 to be plugged directly into a computer for configuration and troubleshooting by the installer. By including the USB-OTG interface 76, the logic element 64 can act as both a host and slave device: the logic element 64 acts a slave when attached to a computer, and acts as a host when attached to a flash drive or cellular modem. The USB port 88 is thus usable to download stored data, securely copy encryption key information, communicate over a cellular IP connection, or for other diverse uses. In some embodiments, cellular IP connection functionality of the USB-OTG interface 76 makes the separate CMDC 82 redundant and optionally omitted. Even if the CMDC 82 is included, having access to a USB based cellular modem via the USB-OTG interface 76 can be useful for high value loads or for other purposes. The USB-OTG interface 76 can also be used for updating the firmware on the device, especially for instances where bandwidth costs are high.

The temperature interface 78 is designed to read both the ambient temperature where the logic element 64 is located, and several (e.g. up to three in the illustrative example) low cost thermistors. The ambient temperature is suitably measured by an integrated circuit temperature sensor. In some embodiments, the temperature accuracy is one degree Celsius or better, which enables heat loss through the water heater insulation to be estimated, allowing for improved state estimation. The external thermistors are attached to various points on the water heater, and allow the measurement of temperature in a safe and cost effective manner. Interfacing thermistors is advantageously less expensive as compared with competing temperature sensor devices such as resistance temperature detectors (RTDs) or thermocouples; however, RTDs, thermocouples, or so forth are also contemplated for use as the temperature sensor devices. Electrostatic discharge (ESD) protection is optionally incorporated on the pins of the thermistor inputs to reduce the likelihood of component damage. ESD protection is advantageous because the inputs are handled during installation. In the illustrative embodiment, the thermistors are attached to the screw terminal connector 89, and the thermistors are buffered by an operational amplifier, conditioned with a low pass filter, and digitized by a 12-bit (or higher resolution) analog to digital converter (ADC). Other readout circuits are contemplated.

The hardwired signaling interface 80 provides a low cost interface that can operate on unshielded twisted pairs of wires, with a bus-type network topology, so as to simplify installations at multi-unit residential and commercial sites. In such settings, water heaters may be in close proximity to one another. Instead of providing multiple units broadcasting over a single RF channel, the units can be wired to each other directly via the hardwired signaling interface 80. Direct wiring increases communications reliability and reduces latency. The hardwired signaling interface 80 preferably employs a low voltage, bus architecture such as CAN or RS-485, by which load controllers can be daisy-chained together. In settings in which wireless communications are unreliable or otherwise problematic, low voltage twisted pair of wires can be run from each water heater controller to a logic element 64 acting as an IP Gateway that in turn connects to the nearest available Ethernet port. Wired communications also have an advantage over power line communication (PLC) methods in that PLC typically requires devices to be on the same electric phase. For commercial and multi-unit residential settings, identifying the phase may be difficult. PLC is also susceptible to power line noise from electric equipment.

The connection to the power interface element (PIE) 66 from the logic element (LE) 64 is made via a suitable connector 92. The signals transferred between the PIE and LE are preferably low voltage and low current. In one approach, the connector is recessed within an enclosure of the LE 64, such that it is hidden from view if the LE 64 is not attached to a PIE 66. To drive relays present on or in the PIE 66, a relay driver 96 separates the port outputs on the processor 70 from the relays on the PIE 66. Optionally, a serial peripheral interface (SPI) bus may be provided to link the PIE 66 and the LE 64, so as to facilitate employment of various circuits for measuring the voltage and current consumed by the load.

In the illustrative embodiment of FIG. 11, the user interface comprises a set of lights 94 that indicate device activity or activities. A suitable configuration includes three lights: a packet sent indicator light, a packet received indicator light, and a load switch status indicator light. Error codes can also be conveyed with only three lights, e.g. by a flashing designated sequence to indicate a particular error code. In the illustrative embodiment there are no user input buttons or the like, as configuration is suitably performed via the USB port 88. Other user interface elements are contemplated, including user controls such as buttons or the like, which may be additional to or alternative to configuration via USB.

The PIE 66, when connected to the LE 64, suitably provides conditioned DC electrical power to the LE 64 from the AC mains. If the PIE is not present, a plug-in AC/DC adapter can be employed to power the LE 64, for example by providing the LE 64 with a barrel jack to receive the DC power from the AC/DC adaptor. Alternatively, the barrel jack can be omitted and the LE 64 can be power through the USB connector 88 by a standard USB charging adapter.

Figure 12:
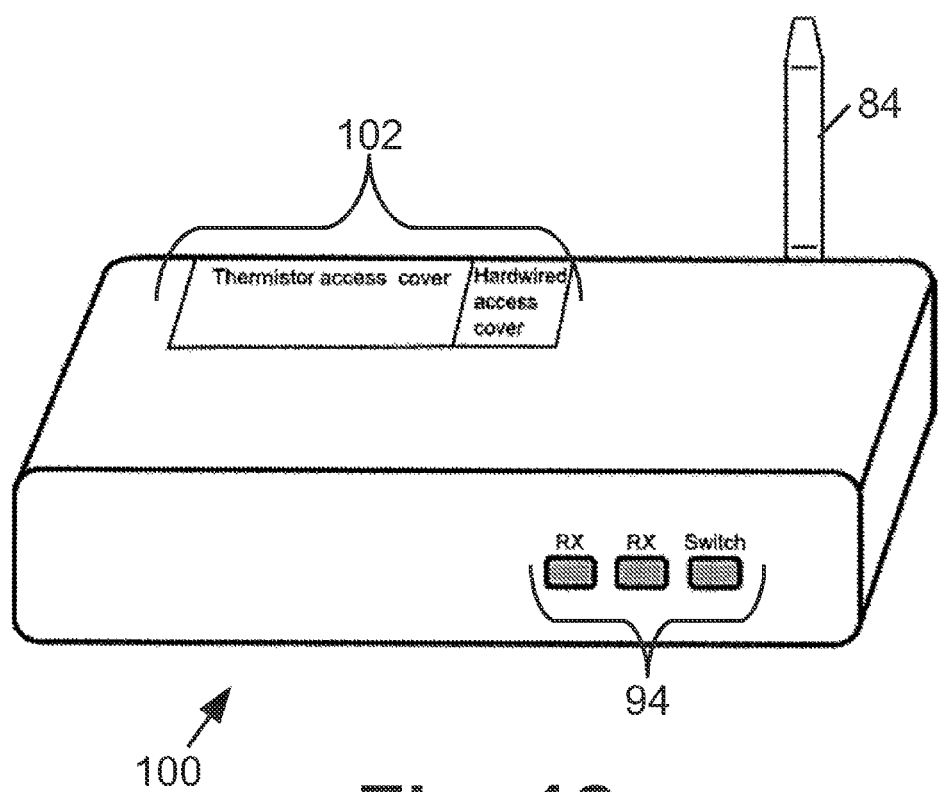

With reference to FIG. 12, an enclosure 100 for the LE 64 can be made of molded plastic since the LE 64 does not contain high voltage. Access to the thermistor and other hardwired connections is suitably made through removable covers 102 that provide access to the screw terminals, wire clips, or other connection elements for quick installation. Cord grips or other strain relief elements are optionally provided for wires entering the enclosure 100. The user interface lights 94 are also mounted in visible fashion on or in the enclosure 100 (e.g. exposed or visible through transparent or translucent windows), and are preferably labeled with suitable labeling. Not visible in FIG. 12 are certain externally accessible features such as the USB connector 88 and the PIE connector 92, which may be located on a backside and/or underside of the enclosure 100.

The optional CMDC 82 typically contains a baseband processor and a battery with charging circuitry. The incorporation of a cellular modem 82 is advantageous for mitigating the effect of network outages by providing an alternate communication pathway, or for providing the main communication pathway in settings with no wired network access. Optionally, the CMDC 82 may also be used to communicate power disruption notifications in real-time, which may be advantageous for electric utilities, customers, or other entities (e.g., telecom providers).

Figure 13:
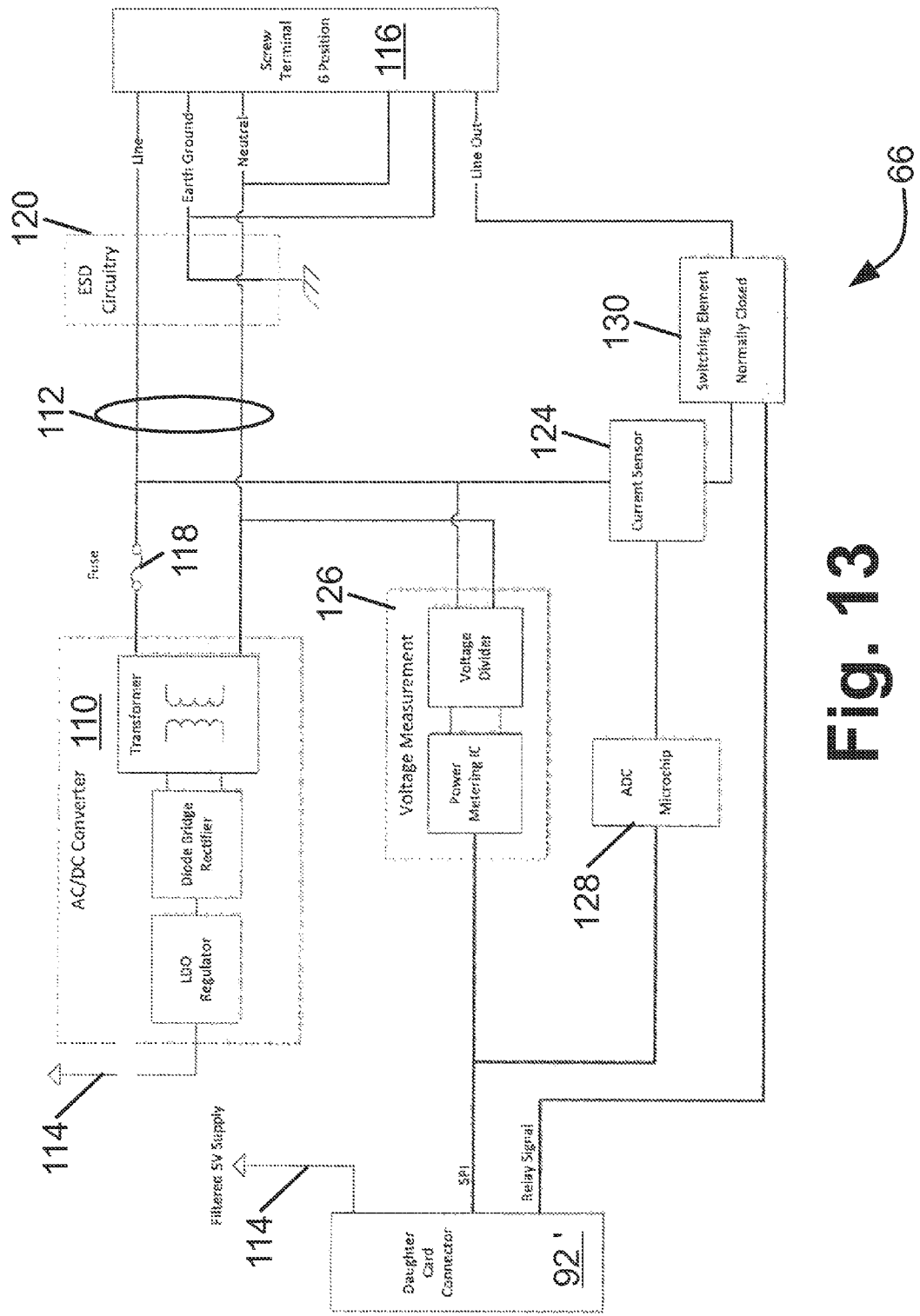

With reference to FIG. 13, an illustrative embodiment of the power interface element (PIE) 66 is described. The illustrative PIE 66 is designed for operation on single phase 240 VAC. The illustrative PIE 66 includes an AC/DC converter 110 to create DC power to operate the LE 64 and electronics on the PIE 66 itself including power switching elements, as well as to power measurement electronics to measure the voltage and current of AC power on the incoming AC power lines 112. The illustrative PIE 66 is configured for a single phase load whose power is lower than the bid power modulation level; however, larger loads are contemplated.

If the power consumption of the load is greater than the power modulation level requested from the market, then the PIE may optionally be configured to perform load cycling at a faster rate than the time interval of dispatch signal updating, with the duty cycle of the load cycling being chosen to provide finer power consumption resolution. For example, consider a 1 MW water heater—such a load operating under binary (i.e. "on" or "off") control would only yield 1 MW resolution. If finer power resolution is desired, the PIE could be designed to allow load cycling within a time interval of the dispatch signal update by use of solid state relays or other fast switching circuitry to employ pulse width modulation (PWM) or other high-speed switching of the power draw from the 1 MW water heater. By adjustment of the PWM duty cycle, the 1 MW load can adjust its power draw at finer resolution, e.g. at 10 KW resolution. By incorporating this switching circuitry and duty cycle control into a PIE specifically designed for the 1 MW load, the logic element 64 can remain a generic component that is not specific to any particular load type. As another example, if a particular water heater type has several distinctive electrical feeds and thermostats, a PIE specific for this water heater type can be constructed, allowing control of all of the feeds and thermostats from a single LE 64 that is not specific to that water heater type.

With continuing reference to FIG. 13, the PIE 66 (unlike the LE 64) does contain AC electric power capable of powering the electric power-consuming load. In the illustrative example, the AC electric power capable of powering the electric power-consuming load is the 240 VAC single phase power. The AC/DC converter 110 of the PIE 66 transforms the 240 VAC single phase power from the input AC voltage lines 112 into a filtered 5V signal 114 (or other design-basis conditioned power) for operating the electronics on the PIE 66 and to power the connected LE 64. The illustrative AC/DC converter 110 includes a transformer to reduce the voltage, a diode bridge to rectify the signal, and a voltage regulator to provide the clean supply signal 114. More generally, other types of AC/DC conversion circuitry can be employed. In illustrative FIG. 13, a screw terminal set 116 provides the input AC power, although other power input couplings are contemplated. The front end of the converter 110 preferably includes an inline fuse 118, ESD protection circuitry 120, and/or other protection to protect against high power draw, electrostatic discharges, or other device failure mechanisms.

The illustrative PIE 66 includes a current sensor 124 and a voltage measurement circuit 126. Various current measurement devices can be employed, such as a Hall effect sensor or a shunt resistor. The illustrative voltage measurement circuit 126 employs a power measurement integrated circuit (PMIC) receiving as input a small differential signal from a voltage divider. The PMIC sends digitized data to the LE 64 through the daughter card interface 92'.

A switching element 130 suitably comprises an electromechanical relay sized to ensure it can handle the load of the heater element of the water heater. The relay for a water heater element is preferably normally-closed so that the hot water heater can continue to function if the LE 64 fails. A flyback diode is optionally placed across the relay coil for electromagnetic field (EMF) protection.

The connection of the PIE 66 with the LE 64 is made through the mating connectors 92, 92'. Signals transferred between the devices 64, 66 are preferably low voltage and low current, while all high voltage and/or high current circuitry is contained in the PIE 66. Signals passing between the PIE 66 and LE 64 include the 5V conditioned power 114, one or more relay driver lines, and an SPI bus carrying data such as the line voltage and current measurements generated by the components 124, 126, 128. In the illustrative PIE 66, the external connector for AC power is the pin screw terminal 116. During installation, the power cord is cut in half, exposing a terminal for each exposed wire. The earth ground and neutral are suitably passed on through board traces, and the line is available when the load controller directs the relay to be closed. A suitable enclosure for the PIE 66 should meet safety requirements for the contained high voltage, and may in some embodiments comprise stainless steel or sheet steel, with suitable grounding.

Figure 14:
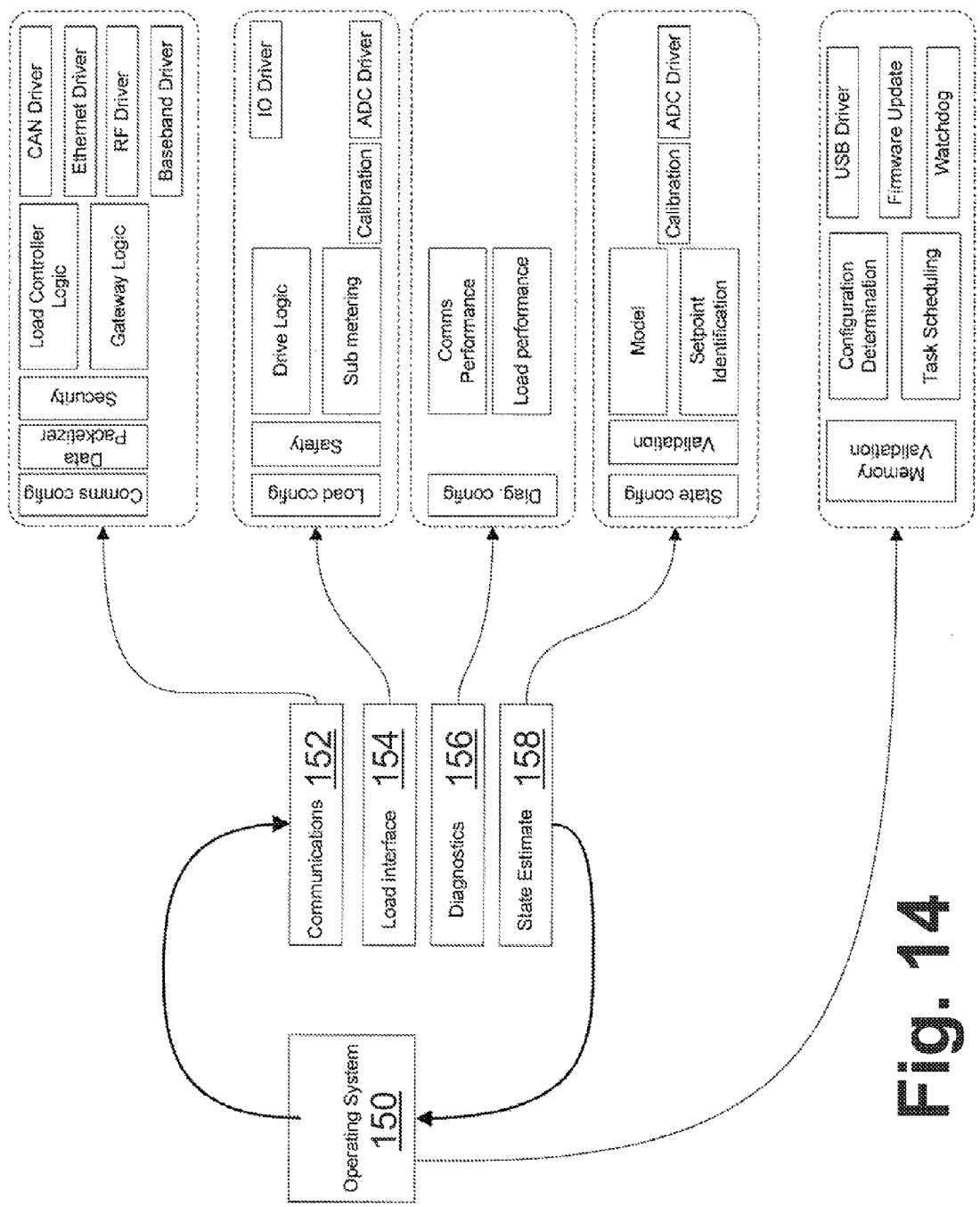
FIG. 14 diagrammatically shows an illustrative software architecture for the illustrative load controller of FIGS. 11-13.

With reference to FIG. 14, suitable software architecture for the load controller of FIGS. 11-13 is described. The illustrative software architecture includes the following components: an operating system 150, a communications component 152, a load interface component 154, a diagnostics component 156, and a state estimate component 158. The right-hand side of FIG. 14 shows a diagrammatic expansion of each component 152, 154, 156, 158 in additional detail. In some embodiments, these components are contained in distinct memory spaces of the processor 70 of the logic element 64, and are independently updatable. By componentizing the software, the bandwidth used during a component update is reduced, and any software errors introduced by an update are localized to the updated component. Upon booting the processor 70, the memory space of each component 152, 154, 156, 158 is optionally check-summed to verify the integrity of that component.

The operating system 150 controls the task scheduling along with the definition and execution of the configuration of the LE 64 and PIE 66. The operating system 150 also performs functions such as controlling inter-component communications, validating memory space, handling firmware updating, and monitoring communications. The USB driver is suitably included in the operating system 150 so as to provide for troubleshooting and upgrading the load controller. In a suitable configuration approach, a program or application running on a computer, tablet, smartphone, or other device is designed to interface with the operating system 150 of the logic element 64 via a USB connection and enable the installer to perform configuration operations using the computer, tablet, or the like such as: setting the LE 64 to be a load controller, gateway, or both; determining what type of PIE 66 is attached (if any) based on a serial number inputted manually or stored in a the PIE 66 (e.g. in an electrically programmable memory, EEPROM, readable via the SPI bus); selecting the primary communications channel between the load controller and the gateway (if any); performing troubleshooting diagnostics; and so forth.

The communications component 152 performs functions such as choosing the communications channel(s) for the set configuration, packetizing/depacketizing and/or encrypting/decrypting data, providing communications security, performing load controller data transmission logic, performing gateway data aggregation and forwarding logic, interfacing with the hardware that communicates on the various physical channels, and so forth. Data entering the communications component 152 is routed based on the configuration settings passed to the communications component 152 from the operating system 150. If the LE 64 is configured as a gateway, it executes gateway logic in which the LE 64 is constantly listening on the primary load controller communications channel and validates, packetizes, and buffers received data and sends out the packets as scheduled by the operating system 150 via Ethernet, baseband, or another communications pathway. If the LE 64 is configured as a load controller, it executes a process (concurrent with the gateway logic if configured as both a controller and a gateway) by which it records data collected internally by the state and load interface into a controller data buffer after being packetized into a standard format. If not operating as the gateway, the load controller logic also transmits the message on the primary communications channel to the gateway when the operating system 150 schedules that task.

The load interface 154 is responsible for aligning its logic with the system configuration, safe operation of the load, the drive logic of the load, sub-metering the power consumed by the load, and interfacing with the physical load control and measurement data channels. The system configuration received from the operating system 150 identifies the type of PIE 66 with which the LE 64 is attached. The load configuration defines load interfacing aspects such as how the drive logic and sub-metering is performed. A safety module component of the load interface 154 analyzes conditions, such as the tank temperature, and takes action over the drive logic if any faults are found, such as excessive heat in the water of a controlled hot water tank, raising the temperature setpoint if it is too low to remove bacteria, or so forth. Drive logic processes the signal from the safety, state estimate and the communications module to turn on or off the relay(s) that switches the power source to the water heater. The drive logic is load type-dependent: a three-phase load needs to control three elements, while a single phase load only requires one. The drive logic interfaces with the I/O driver to create the proper signaling to the relay. A sub-metering module of the load interface 154 is responsible for calculating the kilowatt-hours consumed by the load. It suitably reads the voltage and current of the load and performs the power calculation. In one contemplated embodiment, the sub-metering module digitizes the voltage and current waveforms at a rate of at least 500 Hz, and the power calculation should is performed over a minimum period of one second. For loads more complex than a standard water heater, a phase-cognizant, true-RMS calculation may be employed to record energy consumption corrected for the power factor.

The diagnostics component 156 records status and errors of the load controller or gateway, and (if acting as a controller) records the condition of the water heater (or other controlled load). To track communications issues, module failures, program execution errors, or other diagnosed malfunctions, the upstream server interrogates the diagnostics component 156 for information about such events. A diagnostic interface of the diagnostics component 156 provides a mechanism for the upstream server to query the existence of any detected malfunction events, and under what conditions they occurred.

The state estimate component 158 takes the configuration passed from the operating system 150 and uses it to determine what state the connected load (if any) is in. For a water heater, this state estimate suitably represents the capacity of the water heater to accept or reject energy consumption for the next period of time (where the period may be on the order of 5 minutes, by way of illustrative example). In one embodiment, a state of 100 indicates that the water heater has absorbed all the energy that it can without exceeding the desired maximum temperature, while a state of zero indicates that energy must be absorbed to prevent the water heater from falling below the minimum desired temperature. The state identification optionally incorporates a model of the load whose model parameters are updated dynamically from the measurements made. To update the model and state, the sub-metering data from the load component 154 is combined with the temperature readings made by the state component 158.

The load controller embodiments employing connectable LE and PIE components 64, 66 described herein with reference to FIGS. 9-14 are merely illustrative examples, and more generally the demand response system described with reference to FIGS. 1-8 can be implemented in conjunction with substantially any type of load controller that provides the required information (e.g., state, capacity and rate information for an endpoint in some demand response system embodiments described herein) and controls the attached load in accordance with the received dispatch signal (e.g., operating the load if the load state is greater than the dispatch signal and not operating otherwise, in some demand response embodiments disclosed herein). For example, the load controller can be constructed as a single integrated element providing both logic and power interface functionality, and/or the load controller may be integrated with the load itself, et cetera.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A system operative in conjunction with an electric power grid managed by an electric power grid managing entity, the system comprising:
   a plurality of dispatch engines comprising electronic data processing devices, each dispatch engine configured to service endpoints operatively connected with the dispatch engine by transmitting dispatch signals to the serviced endpoints that cause the serviced endpoints to adjust electric power consumed by the endpoints from the electric power grid in accord with a control signal received by the dispatch engine;
   wherein the plurality of dispatch engines includes:
      a market interface dispatch engine operatively connected to receive its control signal from the electric power grid managing entity, and
      second level dispatch engines operatively connected to receive their control signals from the market interface dispatch engine wherein their control signals comprise dispatch signals transmitted from the market interface dispatch engine to the second level dispatch engines and wherein the second level dispatch engines are configured to service endpoints comprising electric power-consuming loads that consume electric power from the electric power grid.

2. The system of claim 1 wherein each dispatch engine is configured to service the endpoints operatively connected with the dispatch engine by operations including:
   at the dispatch engine, receiving endpoint state information from the serviced endpoints that is indicative of energy stored at the serviced endpoints;
   at the dispatch engine, computing dispatch signals based on the endpoint state information and the control signal received by the dispatch engine; and
   transmitting the computed dispatch signals to the serviced endpoints to cause the serviced endpoints to adjust electric power consumed by the endpoints from the electric power grid in accord with the control signal received by the dispatch engine.

3. The system of claim 2 wherein each dispatch engine is configured to service the endpoints operatively connected with the dispatch engine by operations further including:
   at the dispatch engine, constructing a power consumption schedule for the serviced endpoints based on the received endpoint state information, the dispatch signals being computed at the dispatch engine based on the power consumption schedule and the control signal received by the dispatch engine.

4. The system of claim 3 wherein the power consumption schedule for the serviced endpoints is constructed further based on a capacity of each endpoint and a maximum rate of change of each endpoint wherein the capacity is the maximum power the endpoint can consume from the electric grid and the maximum rate of change is the maximum rate of change in power consumed by the endpoint from the electric grid.

5. The system of claim 1 wherein the plurality of dispatch engines further includes:
   at least one further downstream dispatch engine operatively connected to receive its control signal from one of the second level dispatch engines comprising a dispatch signal transmitted from the second level dispatch engine to the further downstream dispatch engine;
   wherein the at least one further downstream dispatch engine is configured to service endpoints comprising electric power-consuming loads that consume electric power from the electric power grid.

6. The system of claim 1 wherein the second level dispatch engines are configured to service endpoints further comprising sources that supply electric power to the electric power grid wherein the sources consume negative electric power from the electric grid corresponding to supplying electric power to the electric grid.

7. The system of claim 1 wherein the market interface dispatch engine is configured to service endpoints comprising (1) the second level dispatch engines and (2) electric power-consuming loads that consume electric power from the electric power grid.

8. The system of claim 7 wherein the market interface dispatch engine:
   updates dispatch signals to the electric power-consuming loads at an advising rate and
   updates dispatch signals to the second level dispatch engines at a rate that is at least twice the advising rate at which the market interface dispatch engine updates dispatch signals to the electric power-consuming loads.

9. The system of claim 1 further comprising:
   load controllers disposed with the electric power-consuming loads, the load controller disposed with each electric power-consuming load configured to control electric power consumption by the electric power-consuming load in accord with dispatch signals transmitted to the electric power-consuming load by the dispatch engine servicing the electric power-consuming load.

10. The system of claim 9 wherein each load controller comprises:
    a power interface element comprising electric power circuitry configured to conduct AC electric power capable of powering the electric power-consuming load and further containing an AC/DC converter generating low voltage DC power; and
    a logic element comprising an electronic data processing device configured to receive the dispatch signals transmitted by the dispatch engine servicing the electric power-consuming load, the logic element not containing electric power circuitry configured to conduct AC electric power capable of powering the electric power-consuming load;
    wherein the logic element and the power interface element are separate units that are operatively connected to define the load controller, and the logic element is powered by the low voltage DC power generated by the AC/DC converter of the power interface element.

11. The system of claim 1 wherein the second level dispatch engines are configured to service electric power-consuming loads including a water heater configured to heat water in a hot water tank using electric power consumed by the water heater from the electric power grid.

12. The system of claim 1 wherein the second level dispatch engines are distributed geographically over a plurality of geographical locations.

13. A system operative in conjunction with an electric power grid managed by an electric power grid managing entity, the system comprising:
a plurality of dispatch engines comprising electronic data processing devices, each dispatch engine configured to service endpoints operatively connected with the dispatch engine by transmitting dispatch signals to the serviced endpoints that cause the serviced endpoints to adjust electric power consumed by the endpoints from the electric power grid in accord with a control signal received by the dispatch engine, the plurality of dispatch engines including:
  a market interface dispatch engine operatively connected to receive its control signal from the electric power grid managing entity; and
  downstream dispatch engines forming a hierarchy cascading downstream from the market interface dispatch engine with each downstream dispatch engine being an endpoint serviced by a dispatch engine located upstream in the hierarchy and wherein the control signal received by each downstream dispatch engine comprises dispatch signals transmitted by the dispatch engine located upstream in the hierarchy;
wherein the endpoints serviced by the plurality of dispatch engines further include electric power-consuming loads that consume electric power from the electric power grid.

14. The system of claim 13 wherein the hierarchy has D=2 where cascade depth D is the longest path of cascaded dispatch engines, including the market interface dispatch engine, in the hierarchy.

15. The system of claim 13 wherein the hierarchy has D=3 where cascade depth D is the longest path of cascaded dispatch engines, including the market interface dispatch engine, in the hierarchy.

16. The system of claim 13 wherein:
the hierarchy has a cascade depth D which is the longest path of cascaded dispatch engines, including the market interface dispatch engine, in the hierarchy,
dispatch signals to the electric power-consuming loads are updated at an advising rate, and
dispatch signals to downstream dispatch engines are updated at a rate that is at least D times the advising rate at which the dispatch signals to the electric power-consuming loads are updated.

17. The system of claim 13 wherein each dispatch engine is configured to service the endpoints operatively connected with the dispatch engine by operations including:
at the dispatch engine, receiving state information from the serviced endpoints that is indicative of energy stored at the serviced endpoints;
at the dispatch engine, computing dispatch signals based on the received control signal and the state information received from the serviced endpoints; and
transmitting the computed dispatch signals to the serviced endpoints.

18. The system of claim 17 wherein the dispatch signals are computed further based on a capacity of each endpoint and a maximum rate of change of each endpoint wherein the capacity is the maximum power the endpoint can consume from the electric grid and the maximum rate of change is the maximum rate of change in power consumed by the endpoint from the electric grid.

19. The system of claim 13 wherein the endpoints serviced by the plurality of dispatch engines further include sources that supply electric power to the electric power grid wherein the sources consume negative electric power from the electric grid corresponding to supplying electric power to the electric grid.

20. The system of claim 13 wherein the downstream dispatch engines are distributed over a plurality of geographical locations.

21. The system of claim 13 further comprising:
load controllers disposed with the electric power-consuming loads, the load controller disposed with each electric power-consuming load configured to control electric power consumption by the electric power-consuming load in accord with dispatch signals transmitted by the dispatch engine servicing the electric power-consuming load, wherein each load controller comprises:
  a power interface element comprising electric power circuitry configured to conduct AC electric power capable of powering the electric power-consuming load; and
  a logic element comprising an electronic data processing device configured to receive the dispatch signals transmitted by the dispatch engine servicing the electric power-consuming load, the logic element not containing electric power circuitry configured to conduct AC electric power capable of powering the electric power-consuming load;
wherein the logic element and the power interface element are separate units that are operatively connected to define the load controller with the logic element powered by low voltage DC power received from the power interface element.

22. A hierarchical system comprising:
a hierarchy of systems wherein each system includes:
  an aggregation of energy consuming loads wherein each energy consuming load of the aggregation includes electronics configured to generate a bid comprising a state indicating urgency and a consumption power value;
  an aggregate dispatch controller comprising a computer configured to receive the bids of the energy consuming loads of the aggregation and to compute an initial dispatch signal for a next time interval and to transmit the initial dispatch signal to the energy consuming loads of the aggregation;
  wherein the electronics of each energy consuming load of the aggregation further decides whether to operate the energy consuming load over the next time interval at the bid consumption power value based on comparison of its bid state with the initial dispatch signal; and
  wherein the aggregate dispatch controller is further configured to update the dispatch signal over the next time interval based on information acquired over the next time interval and to transmit the updated dispatch signal to the energy consuming loads of the aggregation, the electronics of each energy consuming load of the aggregation updating the decision to operate the energy consuming load over the next time interval at the bid consumption power value as a function of time based on comparison of the updated dispatch signal with its bid state;

wherein the aggregate dispatch controller of each lower-level system in the hierarchy of systems is an effective energy consuming load in the system above it in the hierarchy.

23. An apparatus comprising:
a load controller configured to control electric power consumption by an electric power-consuming load in accord with a dispatch signal received by the load controller, the load controller including:
a power interface element comprising electric power circuitry configured to conduct AC electric power capable of powering the electric power-consuming load; and
a logic element comprising an electronic data processing device configured to receive a dispatch signal and to control power delivered to the electric power-consuming load by the power interface element based on the received dispatch signal, the logic element not containing electric power circuitry configured to conduct AC electric power capable of powering the electric power-consuming load;
wherein the logic element and the power interface element are separate units that are operatively connected to define the load controller with the logic element powered by low voltage DC power received from the power interface element.

24. The apparatus of claim 23 wherein the power interface element includes an AC/DC converter configured to generate the low voltage DC power from AC electric power capable of powering the electric power-consuming load.

25. The apparatus of claim 23 wherein the logic element is further configured to generate a value for a state parameter that is indicative of energy stored at the electric power-consuming load.

26. The apparatus of claim 23 further comprising said electric power-consuming load including:
a hot water tank; and
a water heater configured to heat water in the hot water tank;
wherein the load controller is operatively connected with the water heater to control power delivered to the water heater based on the received dispatch signal.

27. The apparatus of claim 26 wherein the logic element is further configured to generate a value for a state parameter that is indicative of thermal energy stored in the hot water tank based on one or more measurements of water temperature.

* * * * *